(12) United States Patent
Li et al.

(10) Patent No.: US 9,341,837 B2
(45) Date of Patent: May 17, 2016

(54) WIDE FIELD OF VIEW FOVEAL NIGHT VISION SYSTEMS

(71) Applicants: Le Li, Hopewell Junction, NY (US); Haiping Yu, Hopewell Junction, NY (US); Lei Guo, Fishkill, NY (US); Yongxin Tang, Poughkeepsie, NY (US); Shenggang Wang, Fishkill, NY (US); Aaron B. Cole, Bloomington, IN (US)

(72) Inventors: Le Li, Hopewell Junction, NY (US); Haiping Yu, Hopewell Junction, NY (US); Lei Guo, Fishkill, NY (US); Yongxin Tang, Poughkeepsie, NY (US); Shenggang Wang, Fishkill, NY (US); Aaron B. Cole, Bloomington, IN (US)

(*) Notice: Subject to any disclaimer, the term of this patent is extended or adjusted under 35 U.S.C. 154(b) by 252 days.

(21) Appl. No.: 14/020,223

(22) Filed: Sep. 6, 2013

(65) Prior Publication Data

US 2015/0338633 A1    Nov. 26, 2015

Related U.S. Application Data

(60) Provisional application No. 61/743,523, filed on Sep. 6, 2012.

(51) Int. Cl.
*G02B 23/00* (2006.01)
*G02B 23/12* (2006.01)

(52) U.S. Cl.
CPC .............. *G02B 23/12* (2013.01); *G02B 23/125* (2013.01)

(58) Field of Classification Search
CPC ..................... G02B 27/017; G02B 2027/0123; G02B 2027/0178
USPC ............ 250/214 VT, 207, 221, 330; 359/407, 359/411, 419, 429, 480; 313/524
See application file for complete search history.

(56) References Cited

U.S. PATENT DOCUMENTS 5,229,598 A * 7/1993 Filipovich ............ G02B 23/125 250/214 VT
2012/0257005 A1* 10/2012 Browne ............... G02B 27/017 348/36

* cited by examiner

*Primary Examiner* — Kevin Pyo

(57) ABSTRACT

An optical viewing apparatus may include an objective lens assembly and an one eye piece assembly connected to the objective lens assembly. The optical viewing apparatus may exhibit a field of view in the range of between 40° and, preferably beyond 80°, and an eye-relief of at least 15 mm, and the optical viewing apparatus may exhibit a foveated image for at least one field of view (FOV) wherein the optical on-axis resolution decays toward the periphery of the field of view.

28 Claims, 40 Drawing Sheets

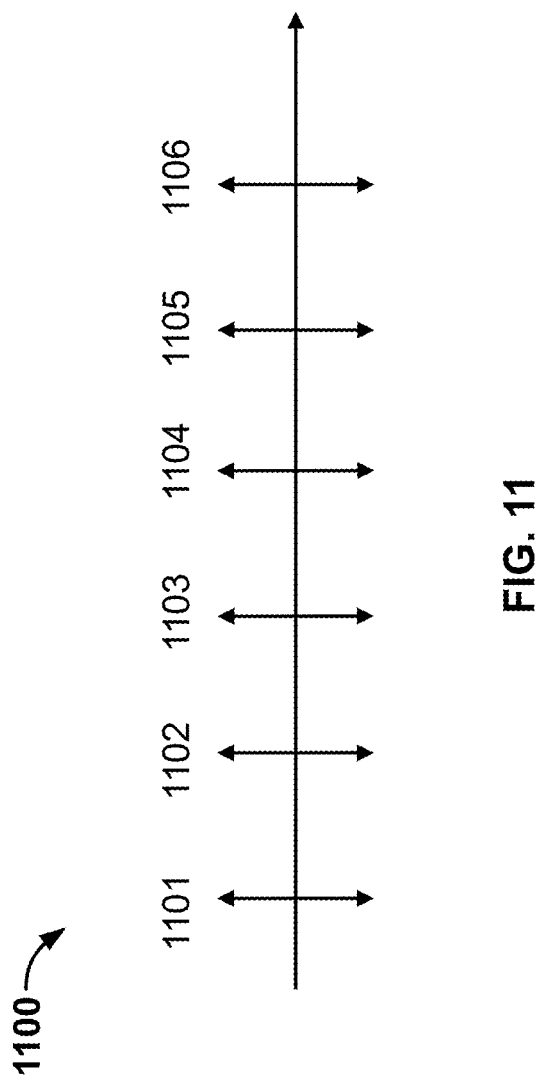

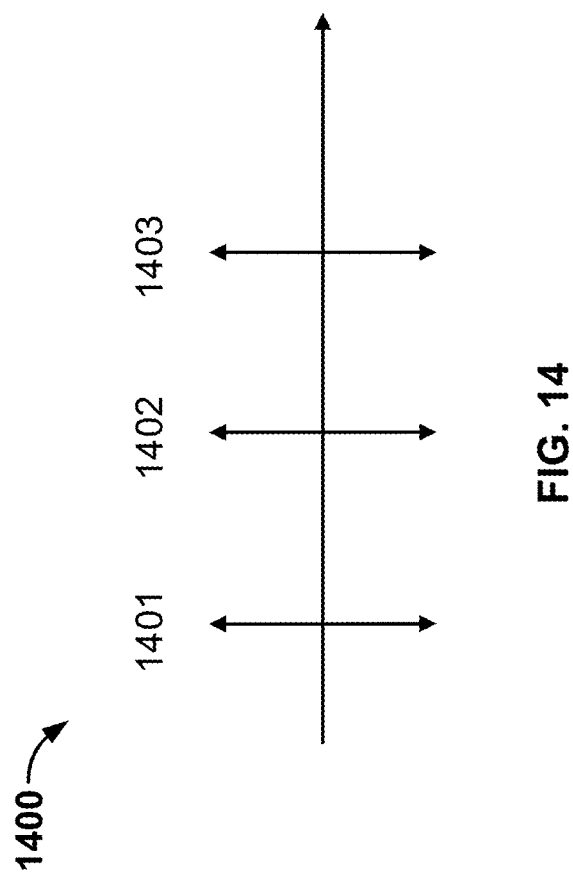

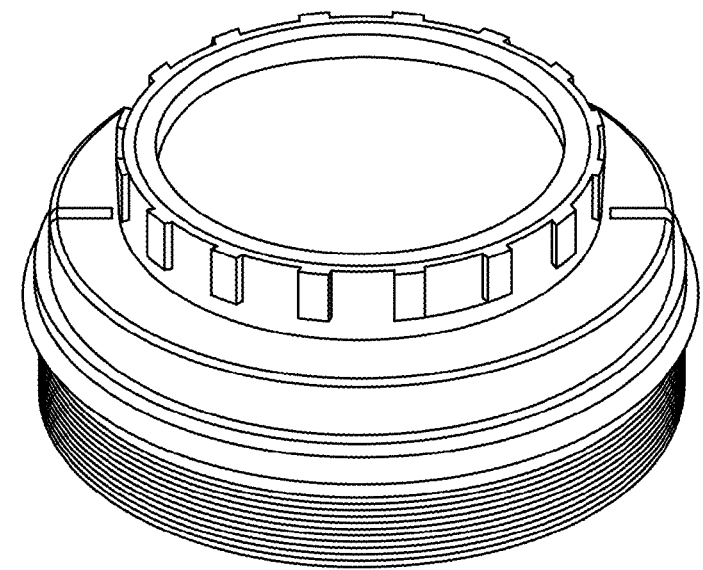

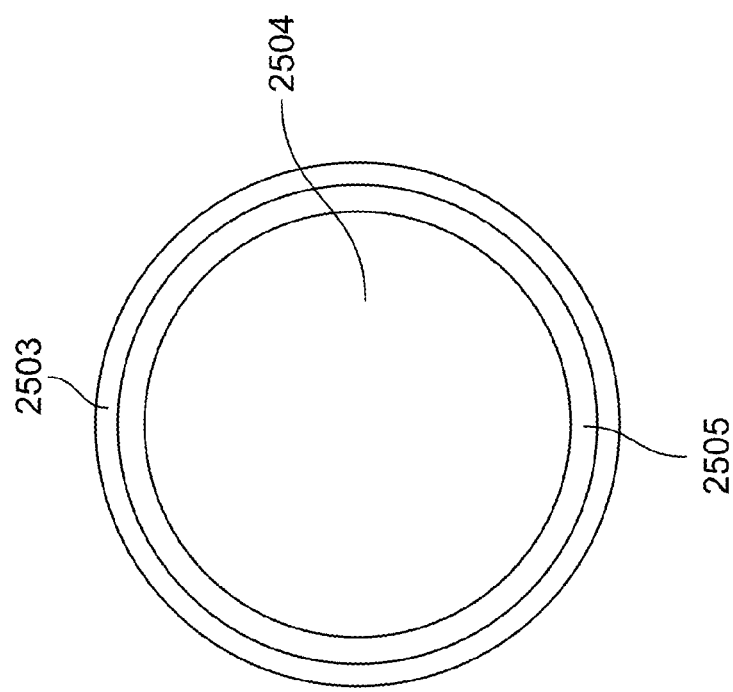

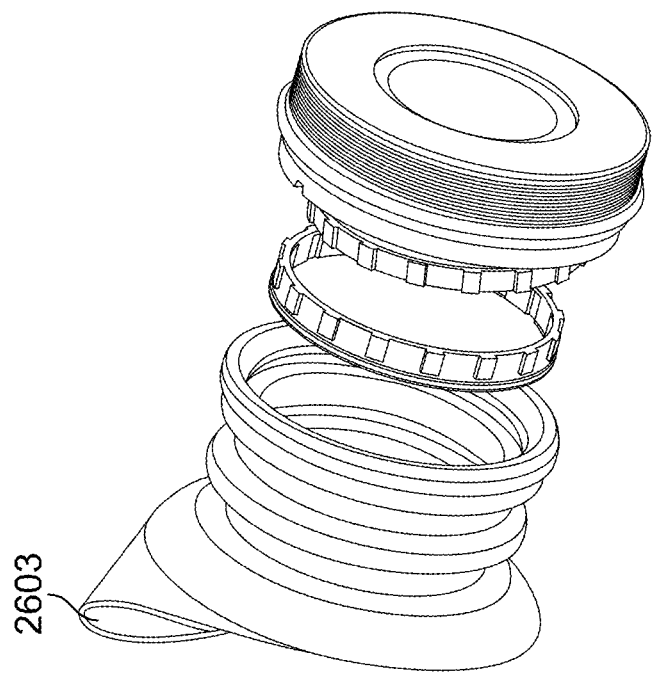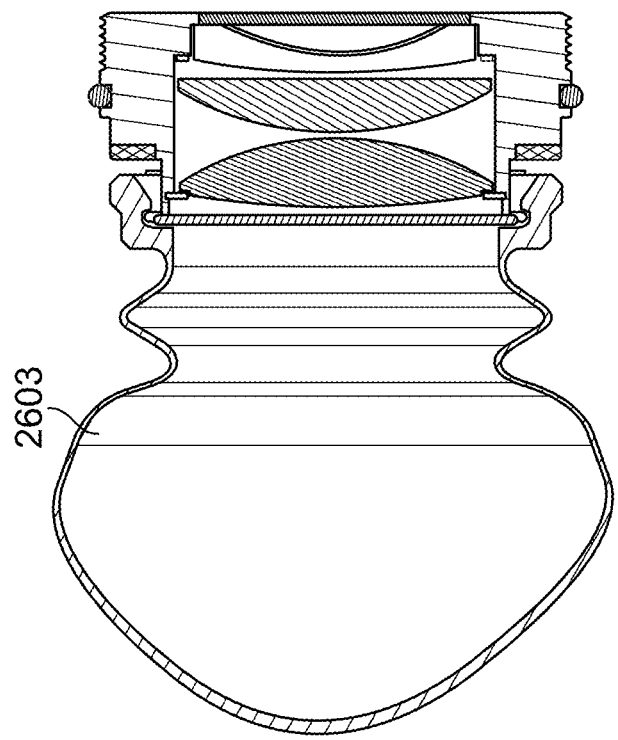
FIG. 26B

WIDE FIELD OF VIEW FOVEAL NIGHT VISION SYSTEMS

PRIORITY

The present invention claims priority under 35 USC section 119 and based upon a provisional application with a Ser. No. 61/743,523 which was filed on Sep. 6, 2012.

FIELD OF THE INVENTION

This invention relates to Wide Field of View (WFOV) night vision systems with foveal characteristics and the respective underlying technologies.

BACKGROUND

Night vision goggles (NVG) consist of four major components: 1) an Objective Lens Assembly (OLA), 2) an Image Intensifier (I2) tube, 3) NVG control electronics with battery, and 4) an Eyepiece Lens Assembly (ELA). The objective lens assembly images the outside infrared (IR) scene (up to 900 nm in the optical spectrum) onto the Image Intensifier tube. The Image Intensifier tube converts the IR image to a visible image that is green color at ~543 nm from the I2 tube phosphor screen. The eyepiece lens assembly then relays the green image to the observer's eye. All these components are integrated into a mechanical housing. Each NVG's Field of View (FOV) is determined principally by its OLA and ELA, while the NVG's resolution is determined by the combination of the OLA, ELA, and the I2 tube.

Currently, the majority of typical NVG has a limited circular FOV of 40°. Attempts to further increase the FOV without compromising resolution are restricted by general optics principles. These optics principles dictate that having both a WFOV along with high resolution can not be obtained simultaneously from an optical NVG system containing modern I2 tubes. For example, the PVS-15 series of binocular NVG has a 40 degree FOV with an on optical axis resolution of 1.3 cycles/milliradians (mRad).

SUMMARY

An optical viewing apparatus may include an objective lens assembly; and an eyepiece assembly connected to the objective lens assembly. The optical viewing apparatus may exhibit a field of view in the range of between 40° and, preferably up to 80°, and an eye-relief of at least 15 mm, and the optical viewing apparatus may exhibit a foveated image for at least one field of view (FOV) where the optical on-axis resolution is the highest which decays toward the periphery of the field of view.

DESCRIPTION OF THE RELATED ARTS

From an optical standpoint, a NVG system generally consists of a fixed FOV optical objective lens subsystem, an imaging intensifier subsystem, and an optical eyepiece subsystem. A typical single optical channel has the form factor style of a monocular. A typical binocular is often comprised of two optical channels. However, there are some binocular NVG systems with four channels, which from the user perspective comprise two optical channels. These systems can be handheld and/or easily mounted to the different types of helmets or headgear. Typical key system performance parameters are the FOV, system resolution, magnification, distortion, spectral response, eye relief, size, focus range, weight, power, and cost.

AN/AVS-6 and AN/AVS-9: The AN/AVS-6 of Aviator's Night Vision Imaging System (ANVIS) (F4210 Series)[1] from ITT Night Vision enables rotary-wing aviators to conduct and complete night operations during the darkest nights of the year. It is a binocular type, and can be mounted to a variety of aviator helmets, including the SPH-4B, HGU-56P, and Alpha 200 through 900 series of helmets. The AN/AVS-6 uses two third-generation (GEN III) image intensifiers that have a spectral response from 450 to 900 nm. The AN/AVS-6 has a 40° FOV, unity magnification, 1.3 cycles/mrad resolution, 5500 fL/fL (foot Lamberts, or foot-candle, lumen per square foot), brightness gain, 25 cm to infinity focus range, 590 grams binocular weight, and is powered by 2×AA size batteries. It has a simple, relatively lightweight form factor. The AN/AVS-9 of Night Vision Goggles/Image Intensifier Set (F4949 Series)[2] from ITT Night Vision has basically the same features as an AN/AVIS-6, but with extra features such as Class A, B, C, and UK 645 minus-blue filters for objective lenses available to suit all types of cockpit lighting, per MIL-STD-3009, including color displays, fighter HUDs, and different Helmet mount configurations designed for fixed-wing and rotary-wing applications. These systems have a common mount which is capable of adapting to most aviator helmets (U.S. HGU-55/P, HGU-56/P, HGU-84/P, SPH-4AF, SPH-4B, SPH-5; British Alpha 202 and Mk4; French OS and CGF). A major disadvantage for both the AN/AVS-6 and AN/AVS-9 is the limited FOV of 40°. This limited FOV restricts off-axis threat detection, reduces situational awareness, and hinders natural peripheral vision. Because of the limited FOV, aggressive head scanning is necessary for maintaining minimal situational awareness during night missions. This scanning promotes disorientation, neck strain, and fatigue in aviators.

[1] Specification of Aviator's Night Vision Imaging System (ANVIS) AN/AVS-6 (F4210 Series), ©2007 ITT, Rev. 9-07, www.nightvision.com
[2] Specification of Aviator's Night Vision Imaging System (ANVIS) AN/AVS-9 (F4949 Series), ©2007 ITT, Rev. 9-07, www.nightvision.com Northrop Grumman Electro-Optical Systems (NGEOS): In order to enhance the FOV, Northrop Grumman had developed the NGEOS WFOV-NVG with 70° H×55° V. The NGEOS has a binocular form factor with each monocular optical path providing a 55 degree circular FOV. The 55 degree FOV per optical path is based on Northrop Grumman's new optical designs for the objective and eyepiece. The way that the system achieves its WFOV is through overlapping the two 55 degree circular FOV's of the two monoculars, but it is not a complete overlap. The 70° H×55° V FOV is achieved by mounting both optical channels in a canted outwards configuration with a 30 degree central region overlap in which both eyes are able to observe the same scene. The advantages of this NVG are a wider FOV. However, 70° H×55° V FOV is still not wide enough, and the users interpupillary distance can affect the observable central region and thus change the horizontal FOV. As a result of the FOV increase, by 75% in horizontal and 38% in vertical directions, the system's resolution is degraded by 20% from the typical resolution of 1.3 cycles/mrad of the baseline NVG to 1.04 cycles/mrad and the system distortion is increased. This optical design change has even undergone some follow-on optimization by diverging the two monoculars and including a higher magnification eyepiece to match the full field distortion requirement of 2% between the eyepiece and objective.

Panoramic Night Vision Goggle (PNVG): The panoramic night vision goggle (PNVG) uses four image intensifier tubes to produce four ocular channels but built in a binocular form factor configuration. The two central channels of the four channels are used to produce a full overlapping 30 degree by 40 degree binocular FOV, while the outer two are used to produce the monocular left and right eye channels of about 35 degrees by 40 degrees. This configuration overall yields 100° H×40° V FOV. Coupling a binocular design with two monocular channels creates a thin demarcation line which separates the binocular image from the monocular peripheral image. Its advantage is the much wider FOV. However, the major disadvantages are the larger size, increased incidences of user neck fatigue and injury due to increased weight, a very high cost of around $65 k/each, and a very degraded resolution of around 0.7-0.8 cycles/mrad[3]. This degraded resolution equates to a 40%~46% reduction in resolution as compared to 1.3 cycles/mrad for typical 40° NVG.

[3]Z. Szoboszlay, L. Haworth and C. Simpson, "A Comparison of the AVS-9 and the Panoramic Night Vision Goggles During Rotorcraft Hover and Landing", *Presented at the American Helicopter Society 57th Annual Forum*, Washington, D.C. May 9-11, 2001, pp. 1438-1467.

OBJECTS OF THE INVENTION

To satisfy the requirements for a lightweight WFOV NVG device with high central resolution, high sensitivity, and very low distortion, the present invention discloses a design that leads to a NVG device with at least twice the field of view of existing night vision goggles to at least 80° with a system's optical resolution that is solely limited by the image intensifier (I2) tube.

It is then an object of the present invention to disclose a wide field of view night vision system with optical foveal characteristics.

It is further an object of the present invention to provide a wide field of view night vision goggle with optical foveal characteristics.

It is further an object of the present invention to provide a wide field of view night vision goggle with optical foveal characteristics which can be mounted onto a helmet and or headgear.

It is further an object of the present invention to provide a means of optical design that leads to wide field of view foveal optics with foveal characteristics.

It is further an object of the present invention to provide a method to retrofit current and existing night vision systems with the wide field of view foveal optics.

It is further an object of the present invention to apply an optical design that leads to wide field of view foveal optics with foveal characteristics to optical direct view systems.

It is further an object of the present invention to apply the optical design that leads to wide field of view foveal optics with foveal characteristics to optical detection systems.

It is further an object of the present invention to apply the optical design that leads to wide field of view foveal optics with foveal characteristics to optical imaging systems.

It is further an object of the present invention to apply the optical design that leads to wide field of view foveal optics with foveal characteristics to optical non-image forming systems.

It is further an object of the present invention to apply the optical design that leads to wide field of view foveal optics with foveal characteristics to digital electro optical systems.

It is further an object of the present invention to apply the optical design that leads to wide field of view foveal optics with foveal characteristics to focal plane array based electro optical systems.

It is further an object of the present invention to apply the optical design that leads to wide field of view foveal optics with foveal characteristics to detector based electro optical systems.

It is further an object of the present invention to apply the optical design that leads to wide field of view foveal optics with foveal characteristics to optical image intensification tube based systems.

It is further an object of the present invention for the optical foveal characteristics to mimic human vision.

It is further an object of the present invention for the optical foveal characteristics to meet any foveal profile as required by either a machine or biological organism.

It is further an object of the present invention to utilize an optical wavefront compensator or a plurality of optical wavefront compensators to design foveal characteristics.

It is further an object of the present invention to combine optical barrel and optical pincushion distortion to design foveal characteristics.

It is further an object of the present invention to combine optical barrel and electrical pincushion distortion to design foveal characteristics.

It is further an object of the present invention to combine electrical barrel and optical pincushion distortion to design foveal characteristics.

It is further an object of the present invention to utilize an optical spatial light modulator or a plurality of optical spatial light modulators to design foveal characteristics.

It is further an object of the present invention to design spatial light modulators with radial axial symmetry and a plurality of various optical paths along each radius.

It is further an object of the present invention to design wavefront compensators with discrete radial axial symmetry and a plurality of various optical paths along each radius.

It is further an object of the present invention to design wavefront compensators with continuous radial axial symmetry and a plurality of various optical paths along each continuous radius.

It is further an object of the present invention to design a spectral chromatic filter gradient or a plurality of various spectral chromatic filters to suppress or augment foveal characteristics.

It is further an object of the present invention to present a passive SLM wavefront compensator which is spectrally achromatic.

It is further an object of the present invention to present a passive SLM wavefront compensator which is spectrally biased towards a narrow wavelength or collection of broad wavelengths.

It is further an object of the present invention to present a passive SLM wavefront compensator which is polarization insensitive.

It is further an object of the present invention to present a passive SLM wavefront compensator which can be tuned to accommodate a variety of polarization states and or profiles.

BRIEF DESCRIPTION OF THE DRAWINGS

The invention may be understood by reference to the following description taken in conjunction with the accompanying drawings, in which, like reference numerals identify like elements, and in which:

FIG. 11 illustrates a schematic illustration of the present invention of a WFOV foveal objective for a night vision goggle.

FIG. 14 illustrates a schematic illustration of the design of a WFOV foveal eyepiece.

FIG. 15 illustrates a demo WFOV foveal eyepiece assembly of the present invention.

FIG. 25(B) illustrates the bandpass coating area on an optical element within the optical train after the intensifier tube.

FIG. 26(A) and FIG. 26(B) illustrate a modified mounting mechanism for the demister filter and eyecup in the present invention.

DETAILED DESCRIPTION OF THE INVENTION

Figure 1:
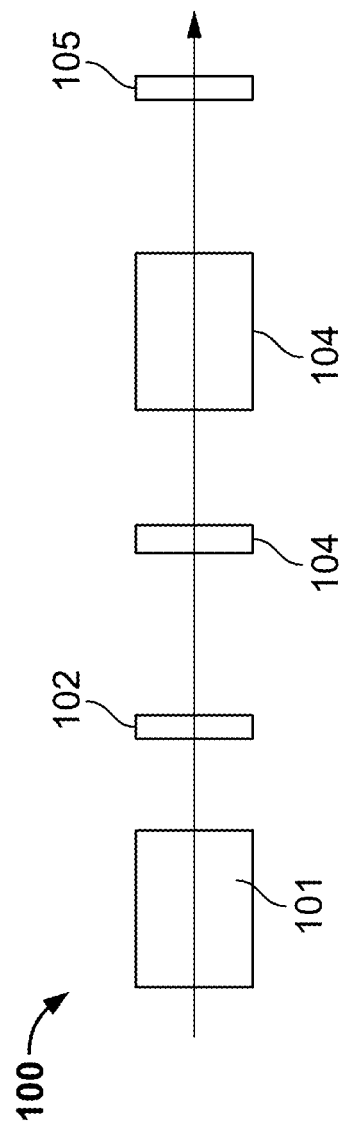
FIG. 1 depicts the layout of the first optical design in the first embodiment that leads to a wide field of view (FOV) foveal night vision goggle (NVG) where the drawing represents one optical channel in a night vision goggle.

The present invention has applied a biologically inspired technology, i.e., foveal technology. Foveal NVG technology both doubles a NVG's FOV from 40 degrees up to 80 degrees and maintains high optical on-axis resolution. Foveal NVG technology moves the optical on-axis resolution performance burden away from the OLA & ELA and places it solely on the resolution of the I2 tube in current typical NVG.

The disclosed Wide Field of View (WFOV) Night Vision Goggle (NVG) is a Foveal Night Vision System (F-NVS) which has an widened field-of-view, capable of reaching an increasingly high resolution along the optical axis; for example, an 80 degrees circular Field of View (FOV) with improved contrast and high resolution capable of reaching 1.6 cycles/mrad along the optical axis. The present invention reaches both WFOV and high on-axis resolution by the optical design of the optical objective and eyepiece subsystems which implements a wavefront compensation mechanism. The wavefront compensation mechanism minimizes the optical aberrations and distortion across the clear aperture but especially in the foveal area in order to maintain high on-axis resolution. The wavefront compensation mechanism is beneficial when combining a new objective and eyepiece designs with the image intensification technologies, such as is found in modern high resolution image intensifier tubes and focal plane arrays. The resultant system features foveated imaging characteristics which are high on-axis resolution that decreases as the FOV angle approaches the FOV periphery. In one specific embodiment, these foveal characteristics mimic the angular resolution characteristics of human vision.

The foveal image is not only made possible by the optimized optical subsystems design with minimized aberrations, but additionally by a spatial light modulator (SLM), performing as a wavefront compensator. The integrated wavefront compensator in the objective and eyepiece subsystems corrects optical aberrations and thereby improves the system's resolution. The passive SLM wavefront compensator is also spectrally achromatic and polarization insensitive.

Foveated imaging is the technique implemented in the optical system design which promotes the highest resolution to a specific area of the FOV, while trading off resolution by gradually degrading resolution towards the image edge. The term originates from the operation of the human eye, where human visual acuity is highly resolved only within a few degrees around the part of the retina called the fovea. In humans the resolution falls off rapidly with an increasing field angle towards the peripheral FOV. However, humans can still detect objects or movement near the peripheral FOV, but in order to highly resolve such objects, they have to center their eyes such that the image of the object forms on the fovea area.

The foveated imaging system mimics the human vision system with variable resolution across the entire large FOV. Thus, the concept not only covers a large field of regard, to maximize awareness, but it also enables precise observation and targeting in the center of the FOV. This new foveal imaging system possesses the characteristics of both WFOV and high on-axis resolution, while reducing the resolution on the periphery of the region of interest. The information about the objects on the periphery is still useful information within the total FOV as it serves to cue and inform situational awareness within the scene.

FIG. 1 depicts the layout of the first optical design (100) in the first embodiment that leads to a wide field of view (FOV) foveal night vision goggle (NVG) (100). The drawing represents one optical channel in a night vision goggle. The design (100) in FIG. 1 comprises at least an objective lens assembly (101) (OLA), a first optical spatial light modulator (102) (SLM), an Image Intensifier tube (103), an eye-piece lens assembly (104) (ELA), and a second optical spatial light modulator (105) (SLM).

The system (100) in FIG. 1 includes a first and second optical spatial light modulators (102 and 105) which provide a wide field of view, with foveal characteristics, while maintaining high on-axis optical resolution. The spatial light modulator 102, 105 acts as a wavefront compensator to correct the optical wavefront distortion after passing through a conventional optics system.

In a related embodiment, the system (100) in FIG. 1 incorporates a plurality of optical spatial light modulators integrated throughout either singularly or both the OLA and ELA, which lead to a wide field of view, with foveal characteristics, while maintaining high on-axis optical resolution. The spatial light modulators act as a wavefront compensator to correct the optical wavefront distortion both after passing through a conventional optics element such as the objective lens assembly 101 and prior to passing through subsequent optical element such as the eye-piece lens assembly (104) in the system.

Figure 2:
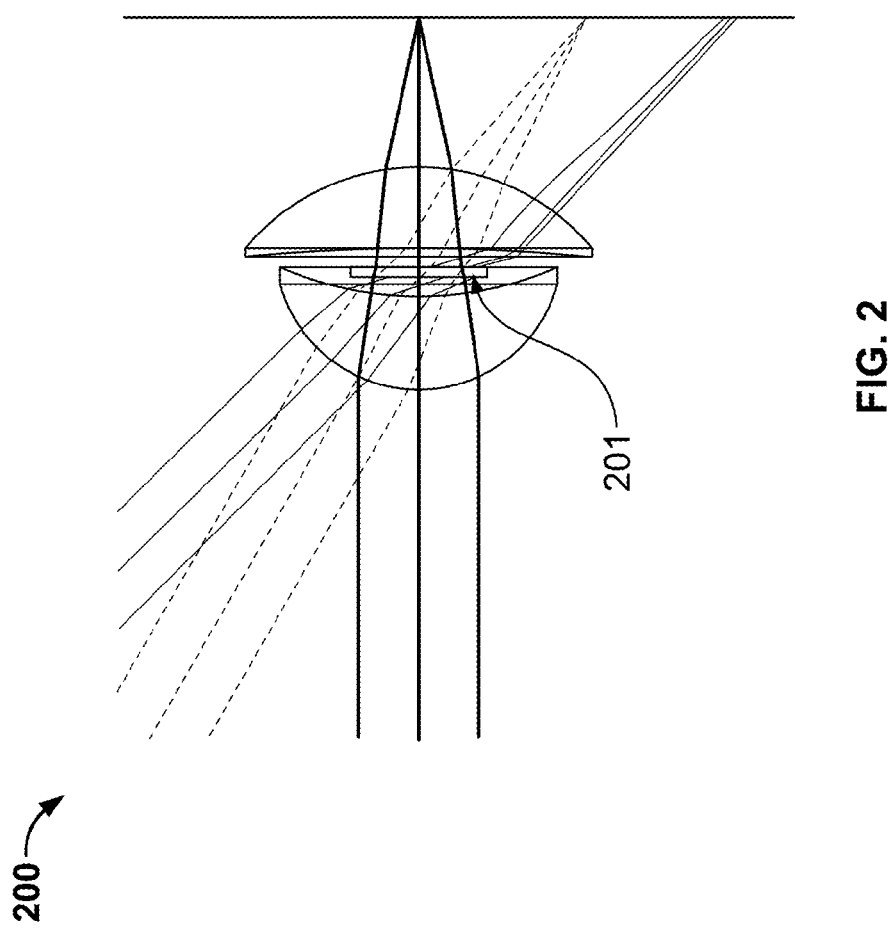
FIG. 2 is a schematic diagram of an exemplary foveal imaging objective system with a wide field of view of greater than 80°.

FIG. 2 shows an exemplary schematic diagram modeled in Zemax® of an optical objective subsystem (200) with a wavefront compensation spatial light modulator (WC-SLM) (201) in between. Per the present invention, this exemplary objective system includes two single lenses and would have full field-of-view (FFOV) of substantially 94° with a F-number (F/#) of substantially 2.36 and a large aberration over the entire FFOV without WC-SLM. With using the WC-SLM, the aberrations have been largely corrected in the central area, which makes the original larger peak to valley Optical Path Difference (p-v OPD) reduced from 6 waves to 0.015 waves for the normal incident beam, resulting in a foveal image with high resolution in the center of view.

Figure 3A:
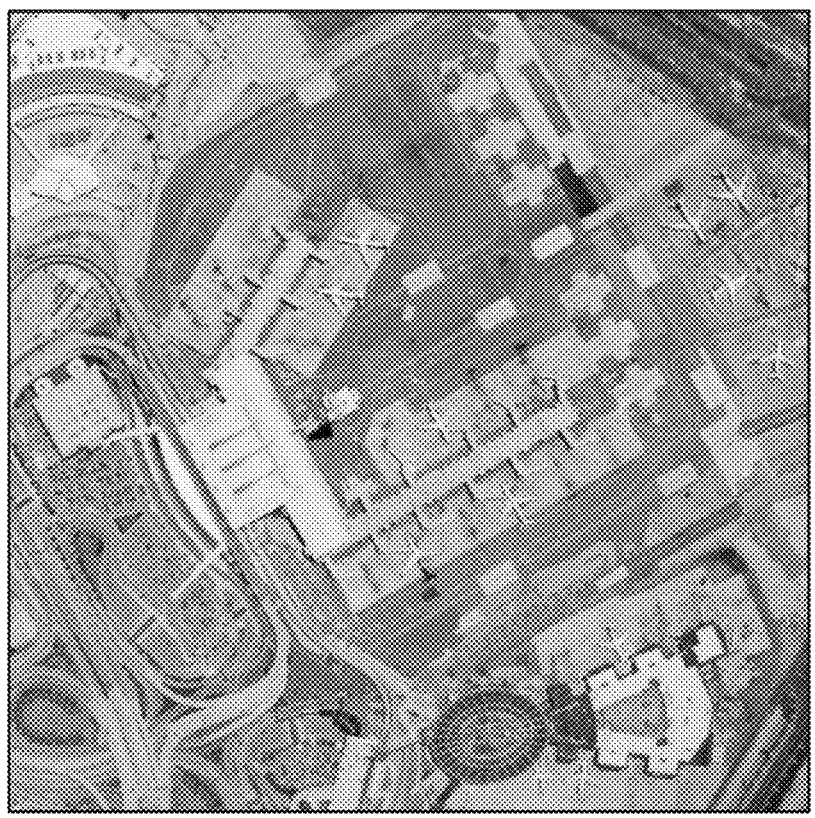
FIG. 3(A) illustrates the input image into the wide field of view objective system of the present invention.
Figure 3B:
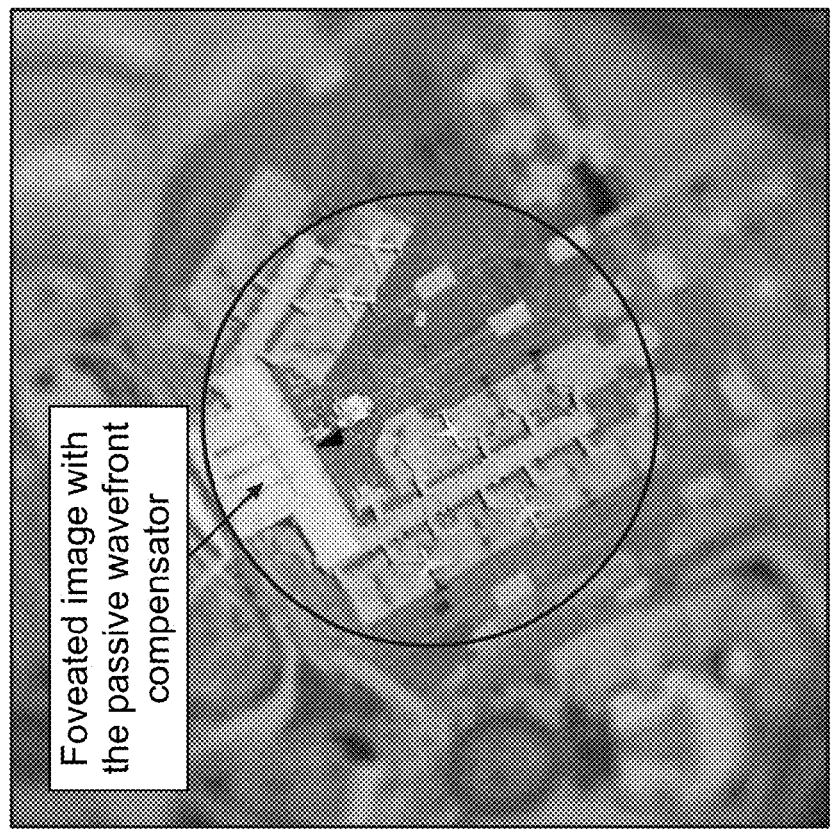
FIG. 3(B) illustrates the displayed modeled image via simulation from the objective system with the wavefront compensation spatial light modulator (WC-SLM).
Figure 3C:
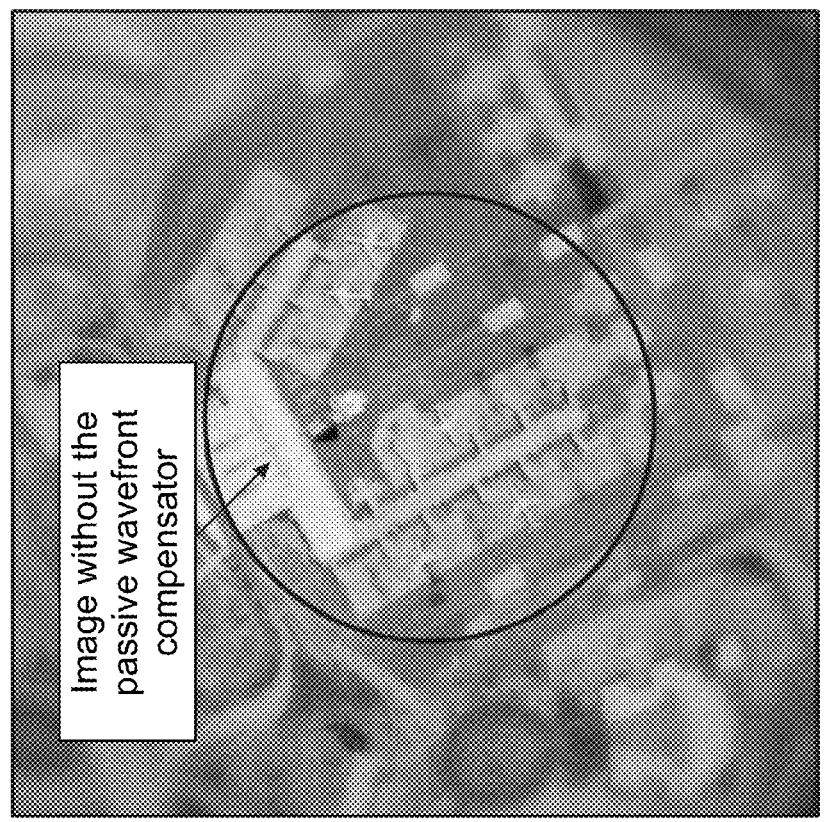
FIG. 3(C) illustrates the displayed modeled image via simulation from the objective system without the WC-SLM.

FIG. 3 shows the modeled performance of the objective system (200) of the present invention. FIG. 3a illustrates the input image, while FIG. 3b and FIG. 3c display the modeled image via simulation from this objective system with and without the WC-SLM, respectively. It is apparent, by comparing the resolution in the circled center area with that of the corresponding two figures, that the WC-SLM improves the system on-axis resolution with improved contrast for details. The resolution improvement is brought about by the WC-SLM aberration correction.

In optics, the aberrations and corresponding wavefront distortions are often expressed by Zernike polynomials, since they are made up of terms that are of the same form as the types of aberrations often observed in optical tests. Zernike polynomials are one of an infinite number of complete sets of polynomials in two real variables, radius $\rho$ and azimuth angle $\theta'$ that are orthogonal in a continuous fashion over the interior of a unit circle.

In practice, the final Zernike polynomial series for the wavefront OPD, W, can be written as follows in Eq.-1 and Eq.-2:

$$W = \overline{\Delta W} + \sum_{n=1}^{\infty}\left[A_n Q_n^0(\rho) + \sum_{m=1}^{n} Q_n^m(\rho)\rho^m(B_{nm}\cos m\theta' + C_{nm}\sin m\theta')\right] \quad \text{(Eq. -1)}$$

$$Q_n^m(\rho) = \sum_{k=0}^{(n-m)/2} \frac{(-1)^k (n-k)!}{k!((n+m)/2-k)!((n-m)/2-k)!}\rho^{n-2k} \quad \text{(Eq. -2)}$$

where $\overline{\Delta W}$ is the mean wavefront OPD, Q is radial function, $A_n$, $B_{nm}$, and $C_{nm}$ are individual polynomial coefficients, and n is an integer n=0, 1, 2, ... and m is projection number, m=0, 1, 2, ..., n. For a symmetrical optical system, the wave aberrations are symmetrical at the tangential plane and only even functions of $\theta'$ are allowed. In general, however, the wavefront is not symmetric, and both sets of trigonometric terms are included. Table 1 gives a list of 15 Zernike polynomials, together with their constant terms.

TABLE 1

First 15 Zernike polynomials

| n | m | No. | Polynomial | |
|---|---|-----|------------|---|
| 0 | 0 | 0 | 1 | |
| 1 | 1 | 1 | $\rho \cos \theta'$ | Tilt X |
|   |   | 2 | $\rho \sin \theta'$ | Tilt Y |
|   | 0 | 3 | $2\rho^2 - 1$ | Power (Defocus) |
| 2 | 2 | 4 | $\rho^2 \cos 2\theta'$ | Astigmatism X |
|   |   | 5 | $\rho^2 \sin 2\theta'$ | Astigmatism Y |
|   | 1 | 6 | $(3\rho^2 - 2)\rho \cos \theta'$ | Coma X |
|   |   | 7 | $(3\rho^2 - 2)\rho \sin \theta'$ | Coma Y |
|   | 0 | 8 | $6\rho^4 - 6\rho^2 + 1$ | Primary Spherical |
| 3 | 3 | 9 | $\rho^3 \cos 3\theta'$ | Trefoil X |
|   |   | 10 | $\rho^3 \sin 3\theta'$ | Trefoil Y |
|   | 2 | 11 | $(4\rho^2 - 3)\rho^2 \cos 2\theta'$ | Secondary Astigmatism X |
|   |   | 12 | $(4\rho^2 - 3)\rho^2 \sin 2\theta'$ | Secondary Astigmatism Y |
|   | 1 | 13 | $(10\rho^4 - 12\rho^2 + 3)\rho \cos \theta'$ | Secondary Coma X |
|   |   | 14 | $(10\rho^4 - 12\rho^2 + 3)\rho \sin \theta'$ | Secondary Coma Y |
|   | 0 | 15 | $20\rho^6 - 30\rho^4 + 12\rho^2 - 1$ | Secondary Spherical |

Figure 4A:
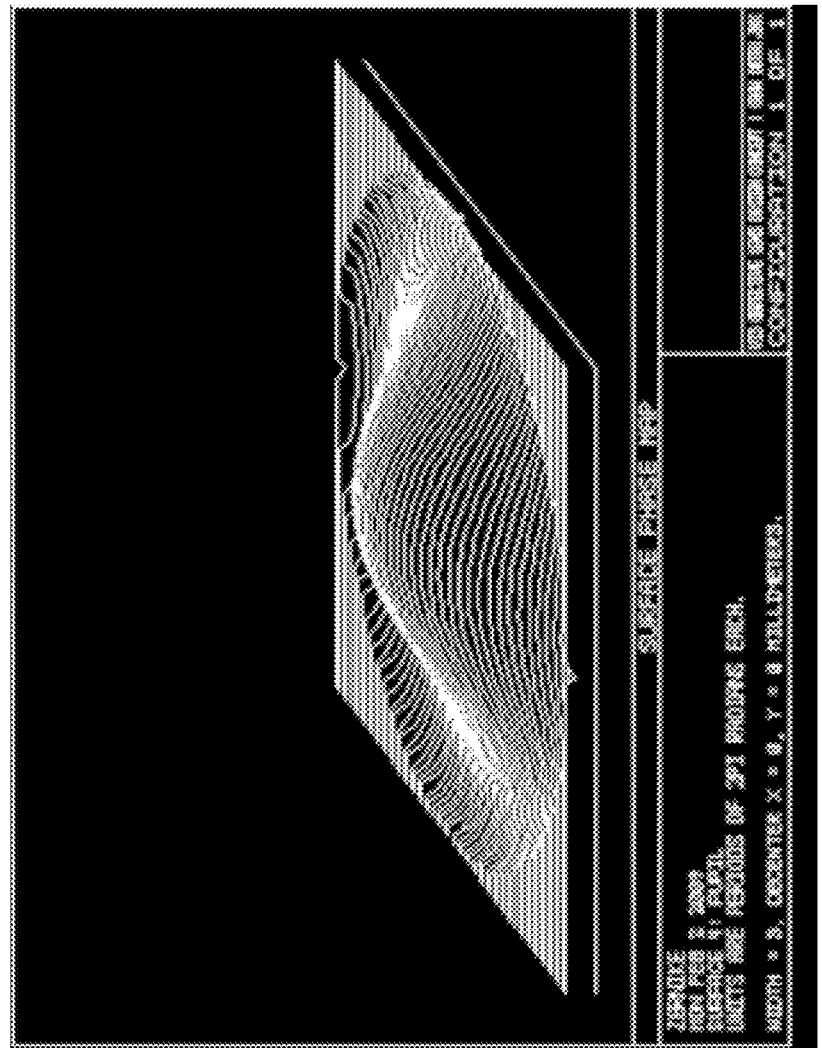
FIG. 4(A) illustrates the calculated aberration of the phase profile.
Figure 4B:
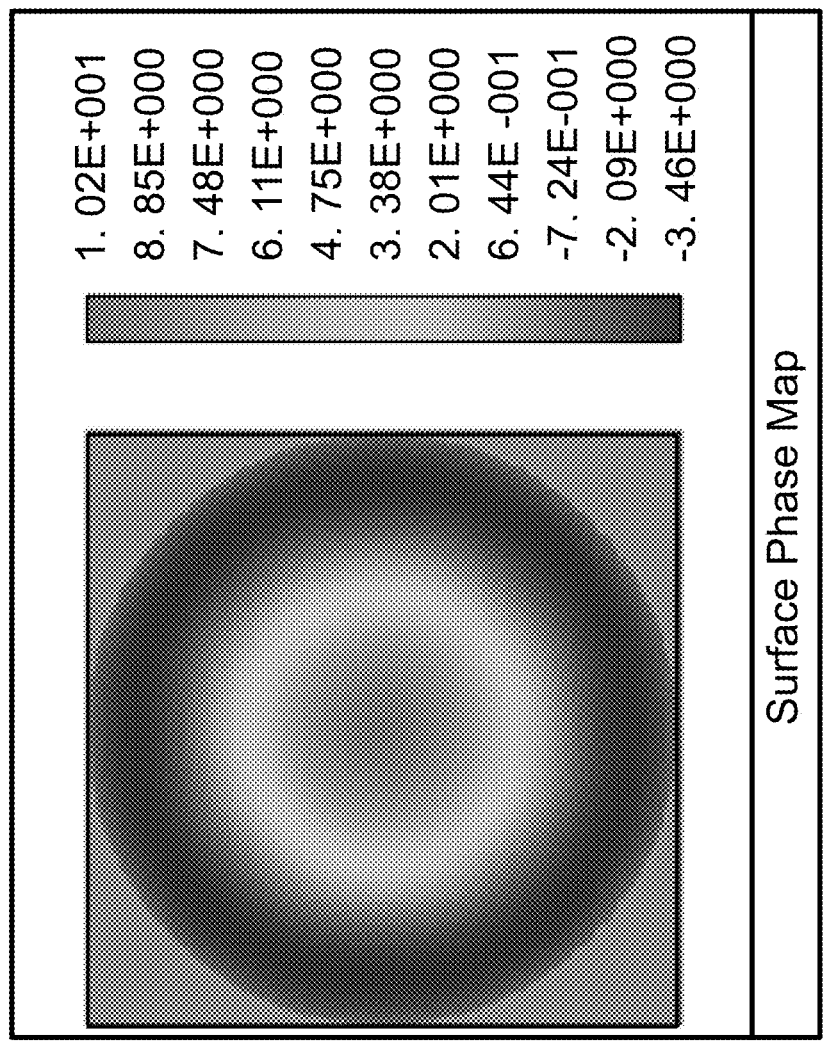
FIG. 4(B) illustrates the calculated aberration of the phase map.

In Table 1, each term contains the appropriate amount of each lower order term to make it orthogonal to each lower order term. Also, each Zernike term minimizes the root mean square (rms) wavefront error to the order of that term. Adding other aberrations of the lower order can only increase rms error. Furthermore, the average value of each term over the unit circle is zero. It should be pointed out that the Zernike polynomials are not necessarily the best polynomials for fitting the test data. FIG. 4a) and FIG. 4b) display the calculated phase profile and the phase map, respectively, based on the Zernike terms with only the radius parameter of defocus, primary spherical, and secondary spherical aberrations present.

Here, the spatial light modulator (SLM) that is used as an optical wavefront compensator including a plurality of discrete pixels and or annular rings. Each pixel/ring is formed and made to have specific optical phase retardation thus the SLM modulates light according to a fixed spatial (pixel/ring) pattern. The SLM can be either active or passive. In an active SLM, the optical modulation of each pixel/ring and/or the entire spatial pattern can be electrically programmable to have different optical phase shifts in order to modulate the light by varying and different degrees. In a passive SLM, each pixel's optical phase shift is fixed and cannot be changed. SLMs have an ever expanding role in several optical areas where light control on a pixel-by-pixel/ring-by-ring basis is near critical for optimum system performance. SLMs are typically used to control incident light in amplitude-only, phase-only, or combinations of the two (phase-amplitude). Also SLM can be reflective or transmissive. The example SLM shown in FIG. 3 is a transmissive phase compensator.

Example 1

Demonstration of a WFOV Foveal Objective with SLM

Figure 5:
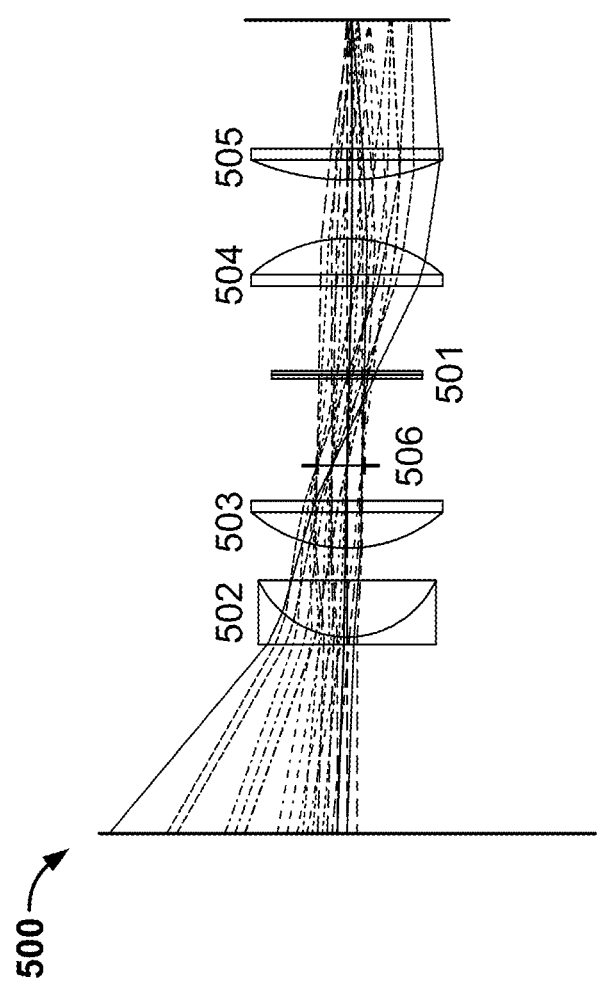
FIG. 5 illustrates a Zemax design of a demo wide field of view (WFOV) foveal objective subsystem implemented with a spatial light modulator (SLM).

FIG. 5 illustrates the Zemax design of a WFOV foveal objective subsystem (500) implemented with a SLM (501), four lens components (502, 503, 504, and 505), and an optical aperture (506) that blocks the unnecessary light outside the field of the view. Per the present invention, a WFOV foveal objective for demonstration was assembled with the four commercial-off-the-shelf (COTS) lens components and an in-house fabricated SLM. The SLM is an active liquid crystal phase array and is driven by the electronic driving board to have the predetermined optical phase profile over its active aperture per the design. Exemplary SLM devices are shown in FIG. 6, FIG. 7, and FIG. 8 respectively, where FIG. 6 illustrates a fabricated radial axially symmetric SLM of three different annular mask periods, FIG. 7 illustrates a SLM with non-uniform annular rings, and FIG. 8 illustrates a SLM with uniform annular rings.

Figure 6:
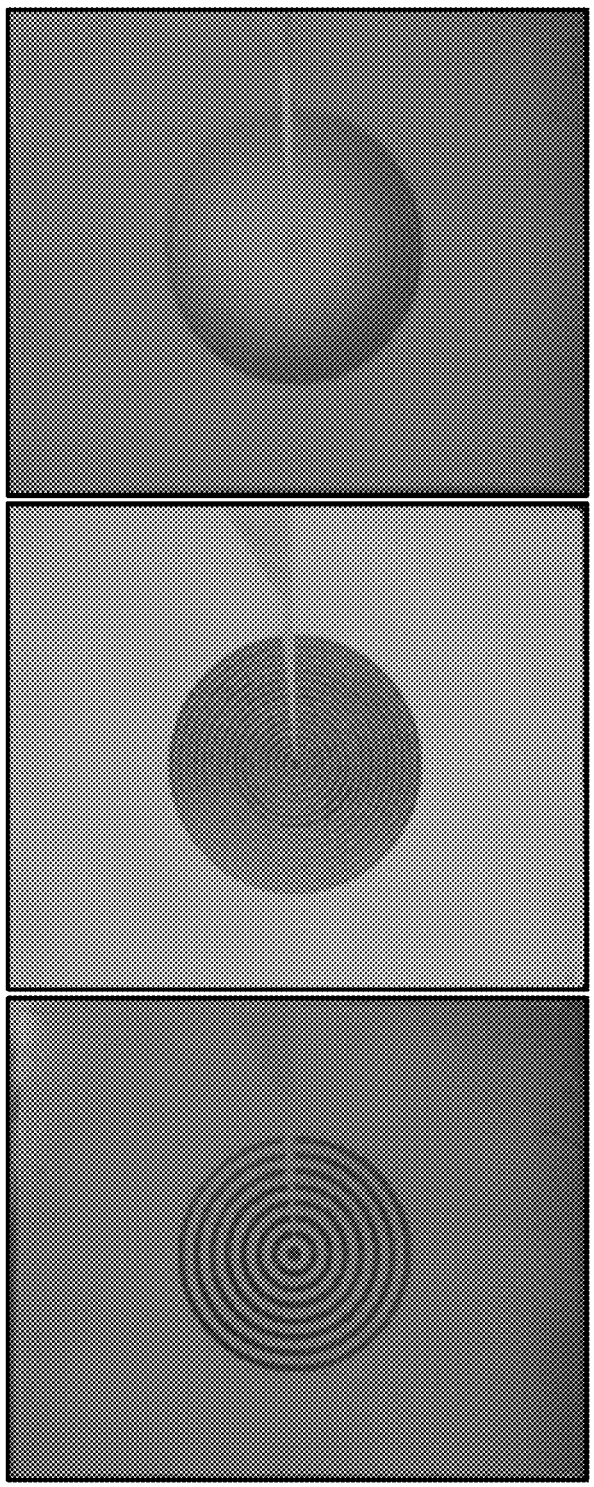
FIG. 6 illustrates a fabricated radial axially symmetric SLM of three different annular mask periods.

FIG. 6 illustrates a fabricated radial axially symmetric SLM of three different annular mask periods.

Figure 7:
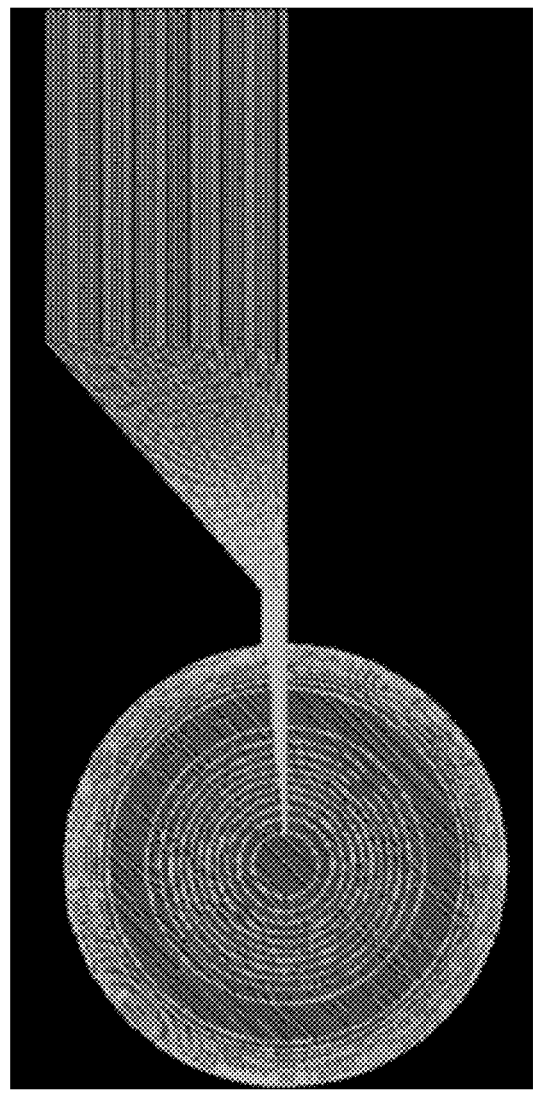
FIG. 7 illustrates a SLM with non-uniform annular rings.

FIG. 7 illustrates a SLM with non-uniform annular rings.

Figure 8:
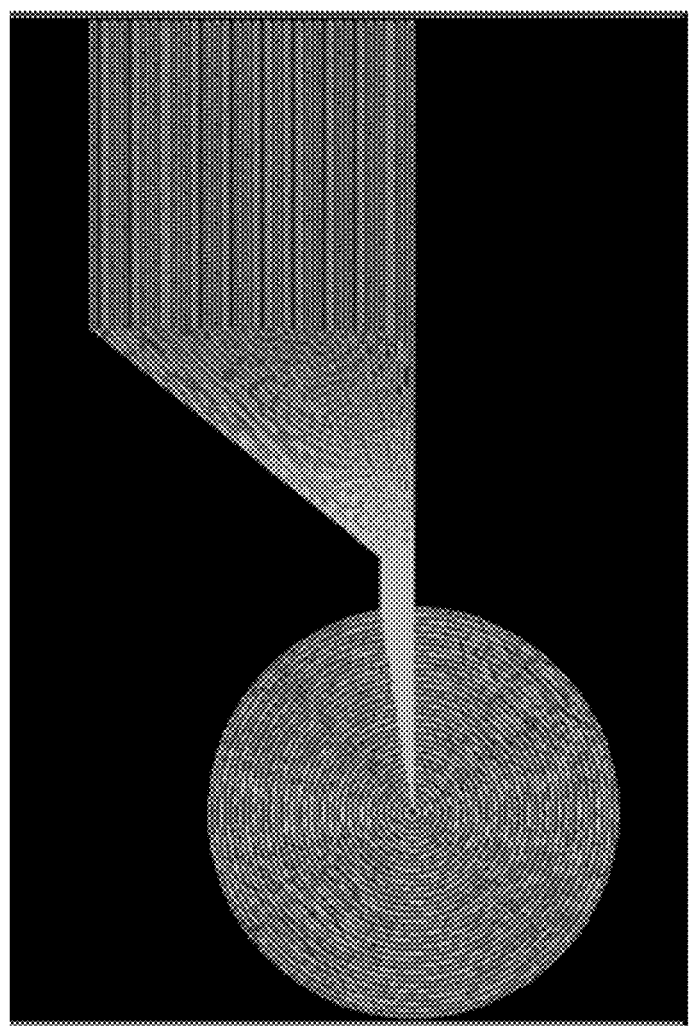
FIG. 8 XX illustrates a SLM with uniform annular rings.

FIG. 8 XX illustrates a SLM with uniform annular rings.

Figure 9:
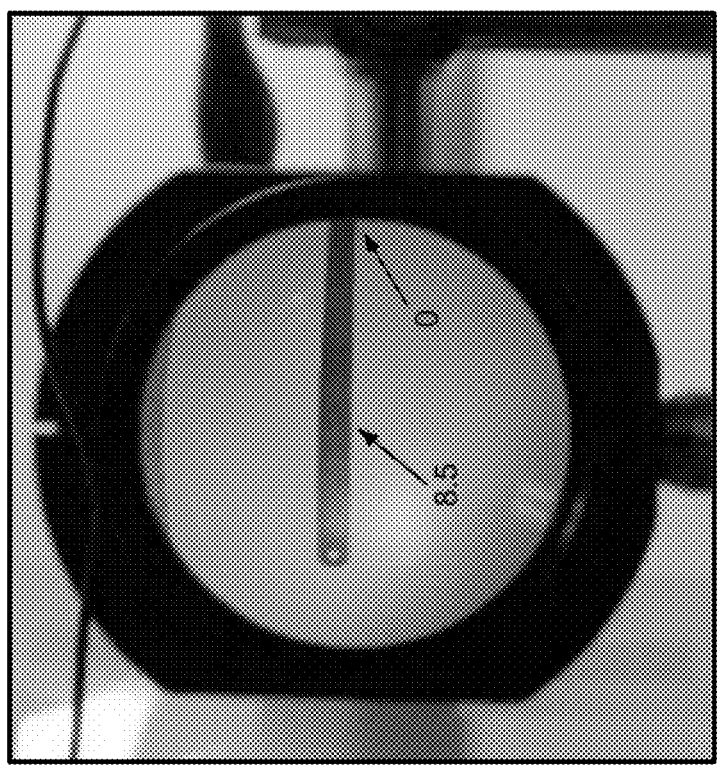
FIG. 9 illustrates an image picture through the demo WFOV foveal objective subsystem indicating ~80° FOV.

FIG. 9 illustrates the recorded picture of the view through the objective, where 80° FOV is achieved. The device was evaluated under a monochromatic light source of a specific polarization. A webcam is utilized as a sensor to record the exiting image from the objective.

Figure 10A:
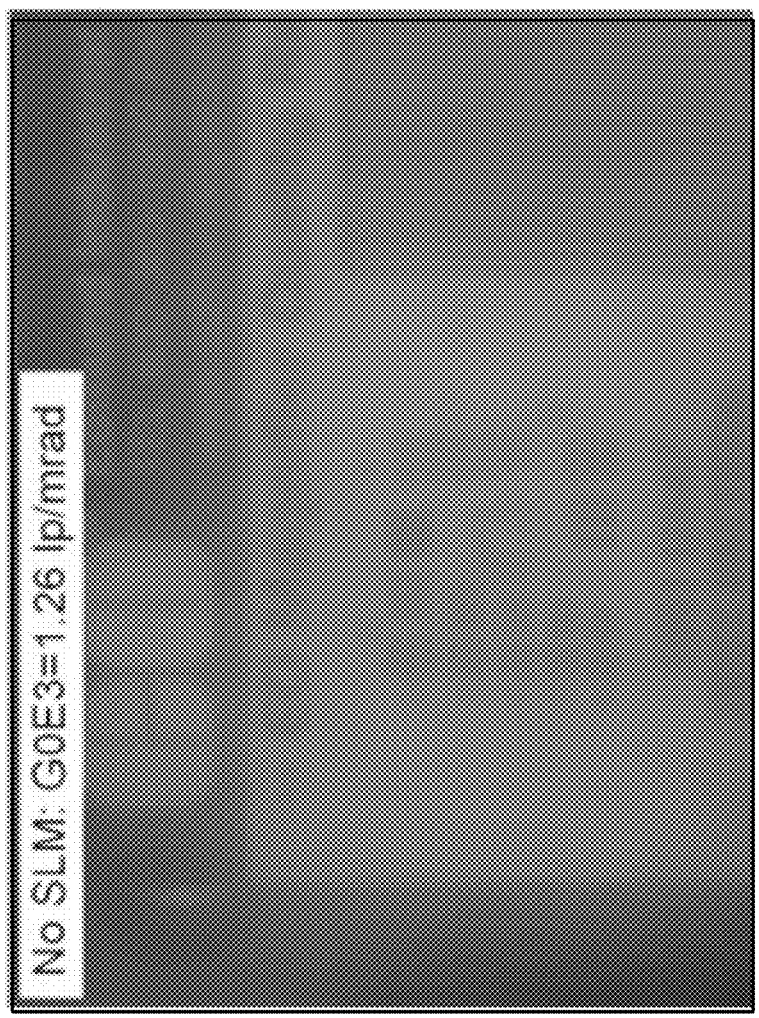
FIG. 10(A) illustrates the Captured Target Image Resolution from the demo foveal objective without the SLM where G0E3 of 1.26 p/mrad is resolved.
Figure 10B:
FIG. 10(B) illustrates the captured target image resolution from the demo foveal objective with the SLM where G0E6 of 1.78 cycles/mrad resolved in the central view.

Several achievements from this demo foveal objective are:
  80° (±40°) full FOV has been achieved.
  The SLM performs very well for the wavefront compensation to minimize the optical aberrations in the objective optics and to effectively enhance the system resolution.
  The foveal objective operations at single wavelength of 633 nm, 780, and 900 nm have been characterized, respectively. For each wavelength, an on-axis resolution of ~3.17 cycles/mrad has been achieved.
  The foveal objective also performs well over a broadband light range of 700-900 nm in the single polarization. As shown in FIG. 10, without the SLM, the exiting image as recorded has a resolution of 1.26 cycles/mrad in the field center with low contrast [FIG. 10*a*]. With the SLM, the image resolution from the foveal objective has increased to 1.78 cycles/mrad, since the target details in the image can be easily resolved up to Group 0 Element 6 (G0E6) (FIG. 10*b*). In addition, the SLM helps to increase the image contrast with negligible blur from the foveal objective, refer to FIG. 10*b*)

As with the OLA, the same principle can be applied to a WFOV foveal eyepiece.

In the second embodiment of this invention disclosure, the wavefront compensation mechanism is directly fused to the optical lens elements for both foveal objective and eyepiece. In another word, the wavefront compensation film(s) in FIG. 1 does not physically exist but its function is implemented into one of the lenses in the objective lens assembly and eyepiece assembly. One of the lenses in the objective lens assembly and/or eyepiece assembly has a surface curvature that is aspherical. The objective and eyepiece assemblies are then installed on a night vision goggle.

FIG. 11 shows a schematic design of an exemplary WFOV foveal objective lens assembly (1100) for the night vision goggle. FIG. 11 includes six lens elements (1101, 1102, 1103, 1104, 1105, and 1106). The goal is to reach an 80 degree field of view. Additional exemplary criteria include: on-axis resolution that is greater than that of the image intensifier tube (current tube resolution is 64 line pair/mm while state-of-the-art tube resolution can reach 81 line pair/mm), optically achromatic over the light spectrum from substantially 500 nm to 900 nm, focal adjustment range from 25 cm to infinity, entrance pupil of substantially 11 mm, etc.

Figure 12:
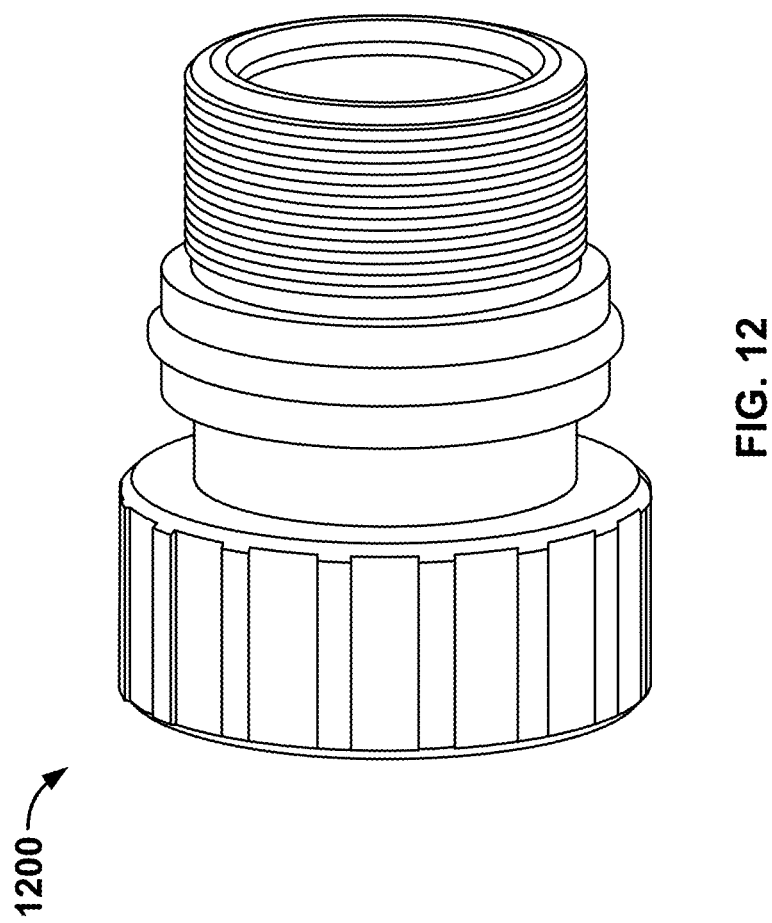
FIG. 12 illustrates a demo WFOV foveal objective lens assembly (F-OLA) of the present invention.

FIG. 12 shows a demo WFOV foveal objective lens assembly (1200) per the design of the present invention, which is to be installed on a standard PVS-15 night vision goggle. The assembled objective has a total length of 44 mm, a maximum diameter of 36 mm, and a total weight of 73.2 g with aluminum housing.

The field of view value of the assembled demo foveal objective lens has been examined and measured to have a circular FOV of 80.1°, meeting and exceeding the specification set forth above.

The demo foveal objective resolution has been measured via measuring its Modulation Transfer Function (MTF) which is measured in term of contrast as a function of spatial frequency. In the measurements of the present invention, the exiting image contrasts from the objective are measured one by one with discrete targets of different spatial frequencies provided by the United States Air Force USAF 1951 Resolution Chart.

Figure 13A:
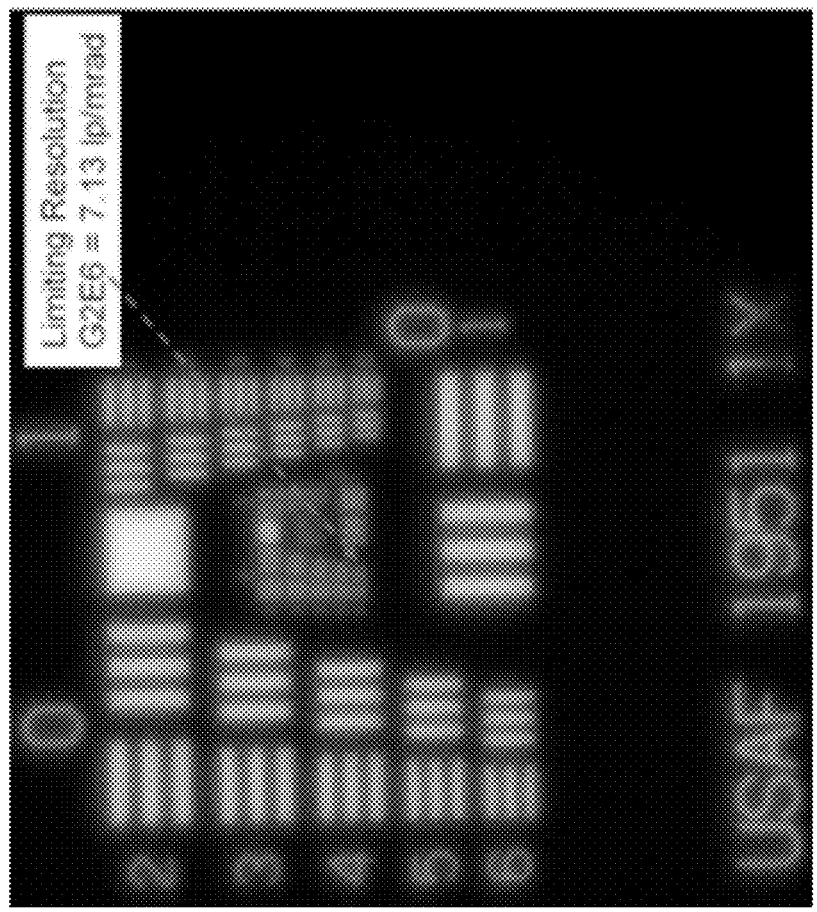
FIG. 13(A) illustrates the measured resolution chart of the demo F-OLA.
Figure 13B:
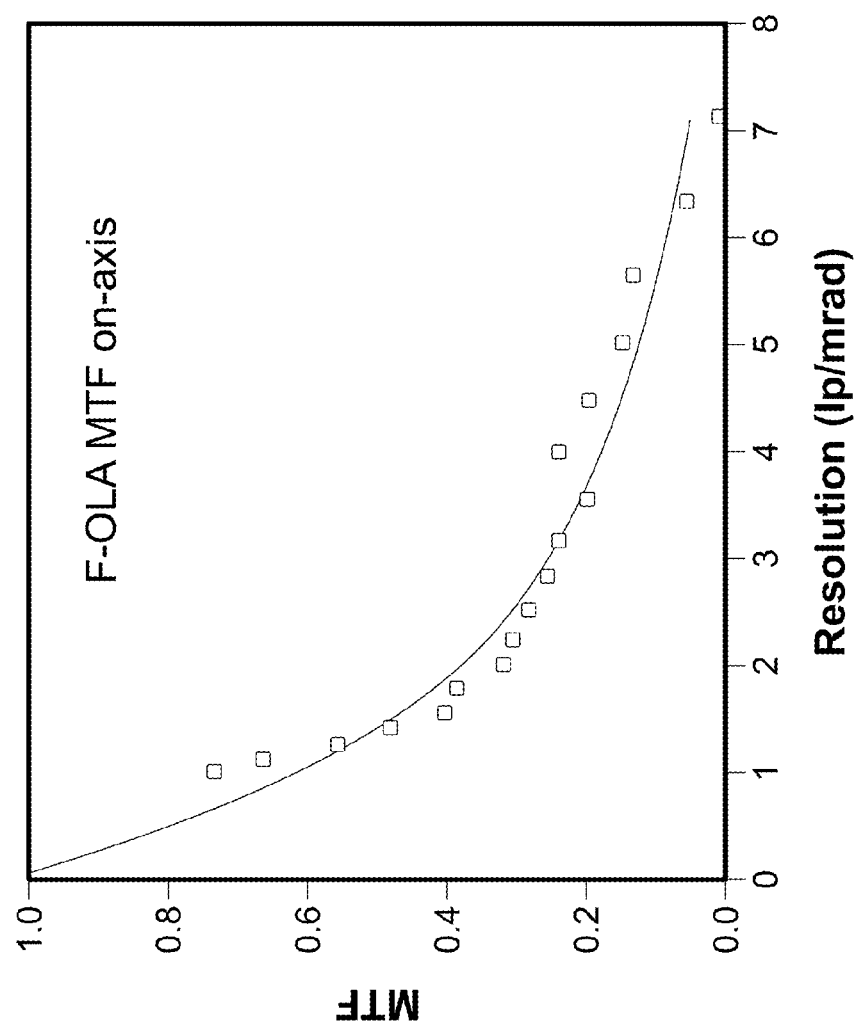
FIG. 13(B) illustrates the measured on-axis MTF of the demo F-OLA.

The measured on-axis resolution of the assembled WFOV foveal objective is 7.13 cycles/mrad, as shown in FIG. 13*a*. FIG. 13*b* shows the measured MTF curve of the result from resolution chart shown in FIG. 13*a*. The dots are data and the continuous line is the curve fit plotted as a guide line. FIG. 13 illustrates that the limiting resolution is around 7.13 cycles/mrad which agrees with the above discussion. The MTF is around 0.55@1.3 cycles/mrad, which is within the tolerance expectations. The measured MTF=0.73@1 cycles/mrad of the foveal objective is well above the requirement of the military specification of MTF>0.65@1 cycles/mrad. As a comparison, the objective lens of a standard night vision goggle of PVS-15 has also been measured whose on-axis MTF=0.67 at 1.0 cycles/mrad target spatial frequency, which just meets the military MTF requirement of MTF=0.65. It is pointed out that the field of view of this standard objective lens is only 40 degrees, while foveal objective of the present invention has a FOV of 80 degrees.

FIG. 14 shows a schematic of the design of an exemplary WFOV foveal eyepiece (1400), in the second embodiment. This aspect of the present invention includes three lens elements (1401, 1402, and 1403). The present invention is also to reach 80 degrees of full field of view. Additional exemplary major criteria of the present invention include: high on-axis resolution that is greater than that of the image intensifier tube, an operational wavelength matching the phosphor emission from the image intensifier tube (around 543.5 nm+/−10 nm), eye relief 15-25 mm, exit pupil 7-15 mm, etc.

FIG. 15 shows a demo WFOV foveal eyepiece assembly (1500) of the present invention, which has been fabricated and tested. The eyepiece has a substantial total length of 19 mm, an approximate maximum diameter of 45 mm, and a total weight of 92.4 g in Al-metal housing.

The field of view value of the demo foveal eyepiece has also been examined. The measured FOV is circular approximately 80.1°, meeting the requirements as set forth above.

Figure 16A:
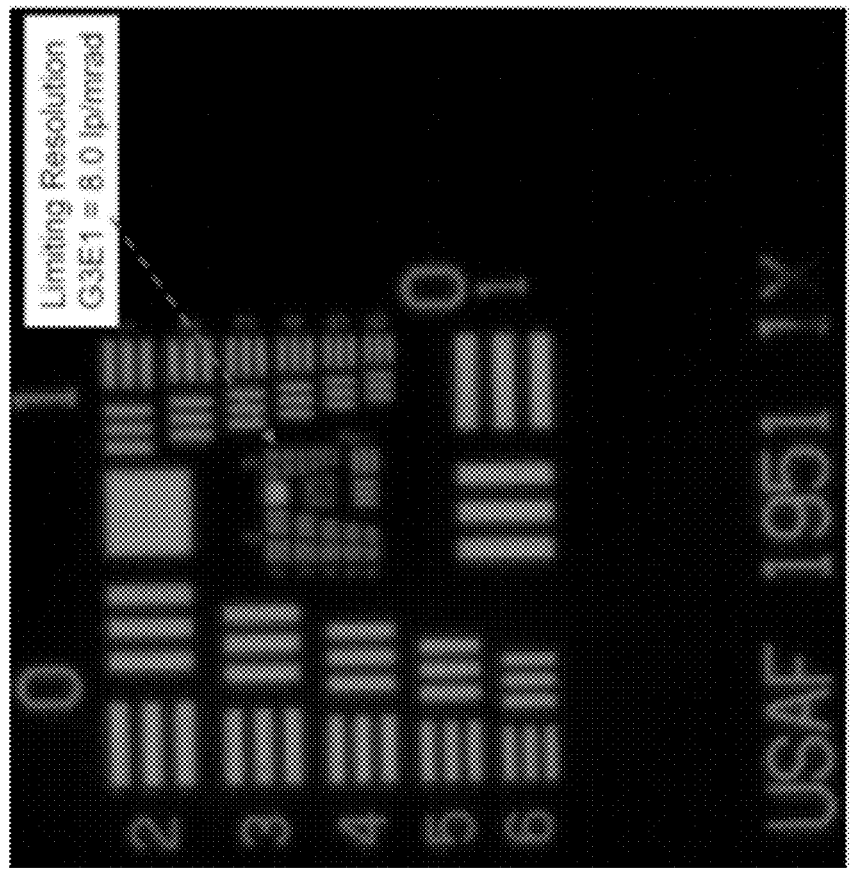
FIG. 16(A) illustrates the measured resolution chart of the demo WFOV foveal eyepiece.
Figure 16B:
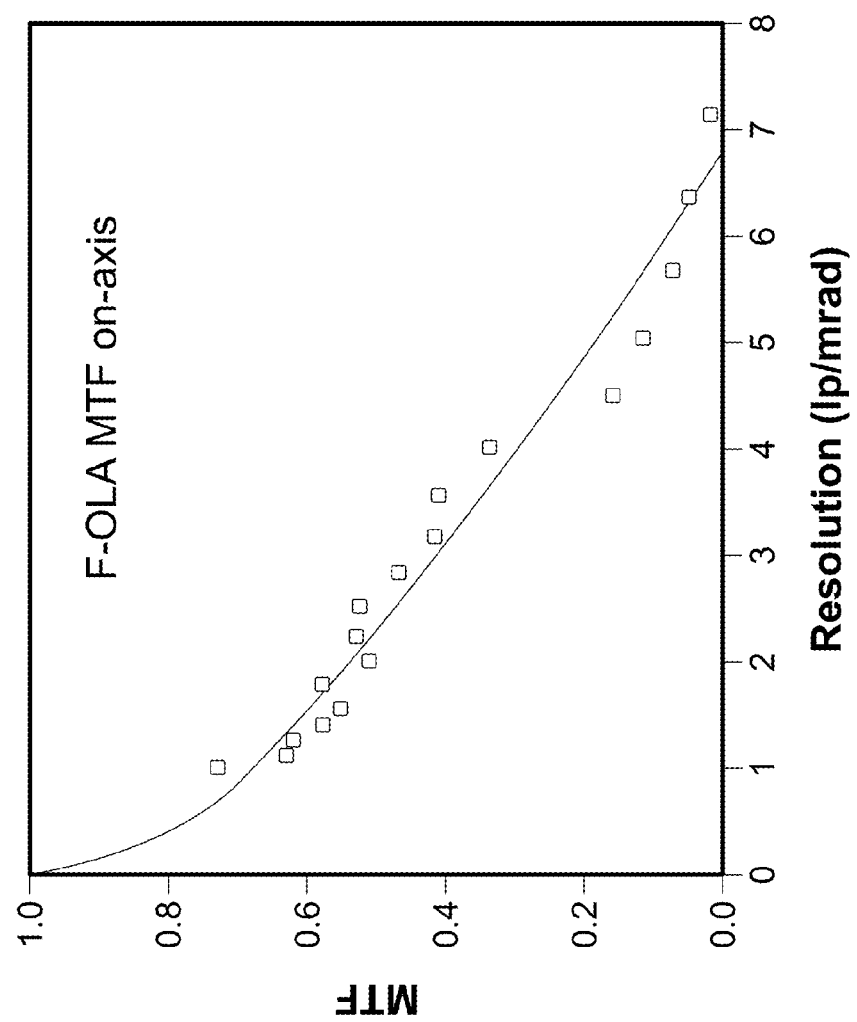
FIG. 16(B) illustrates the measured on-axis Modulation Transfer Function (MTF) of the demo WFOV foveal eyepiece.

The demo foveal eyepiece resolution has been measured via a similar approach as used when measuring the objective lens. The measured on-axis resolution of the assembled WFOV foveal eyepiece of the present invention is approximately 8.0 cycles/mrad, as shown by the recorded resolution chart illustrated in FIG. 16a and FIG. 16b. The dots are data and the line is fitting, plotted as a guide line. The MTF is approximately 0.63@1.3 cycles/mrad, which is within expected tolerance.

In the third embodiment of the present invention, an entire NVG integrated with the WFOV foveal objective and eyepiece is disclosed.

Figure 17:
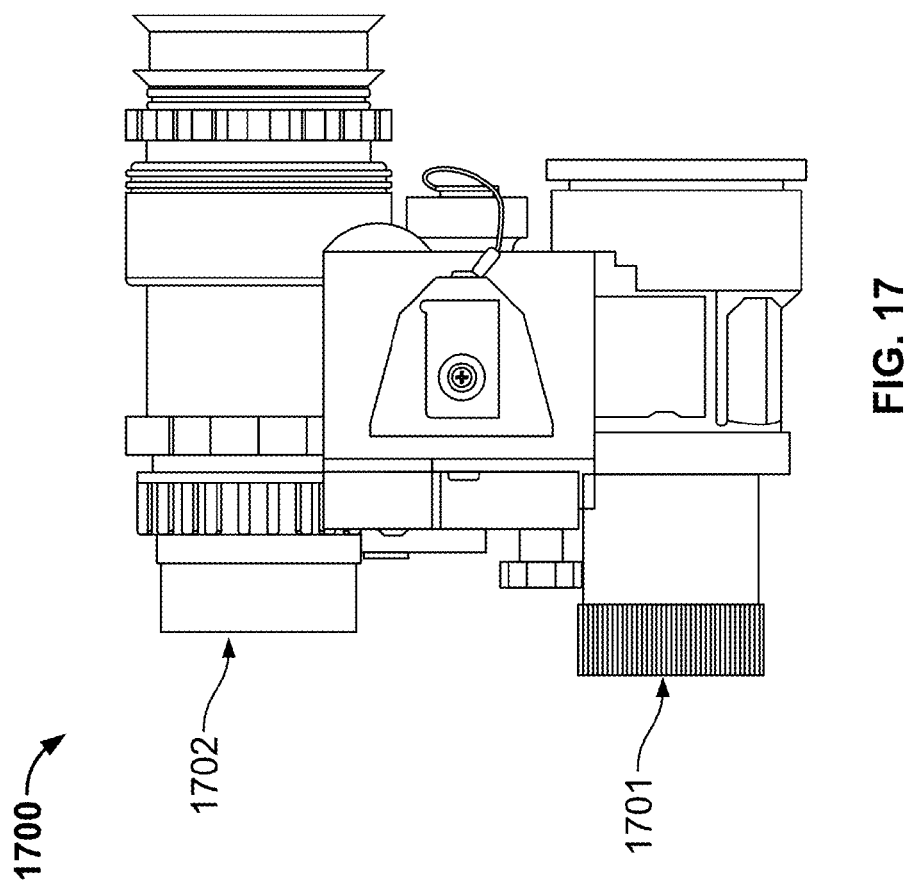
FIG. 17 illustrates a photograph of a foveal night vision goggle (F-NVG) channel with a wide FOV of 80° and an original channel with 40° FOV in a PVS-15 (night vision binocular) housing.

FIG. 17 illustrates a half-retrofitted NVG (1700) based on the standard PVS-15 product with one channel (1701) having the WFOV of 80° (retrofitted) and another channel (1702) that has an original 40° FOV. The present invention provides a device having all mechanical dimensions and the fixtures that are well matched to the PVS-15 main body housing. The retrofitted channel has total length 101 mm, compared to 111 mm in the original form of PVS-15 NVG.

Figure 18A:
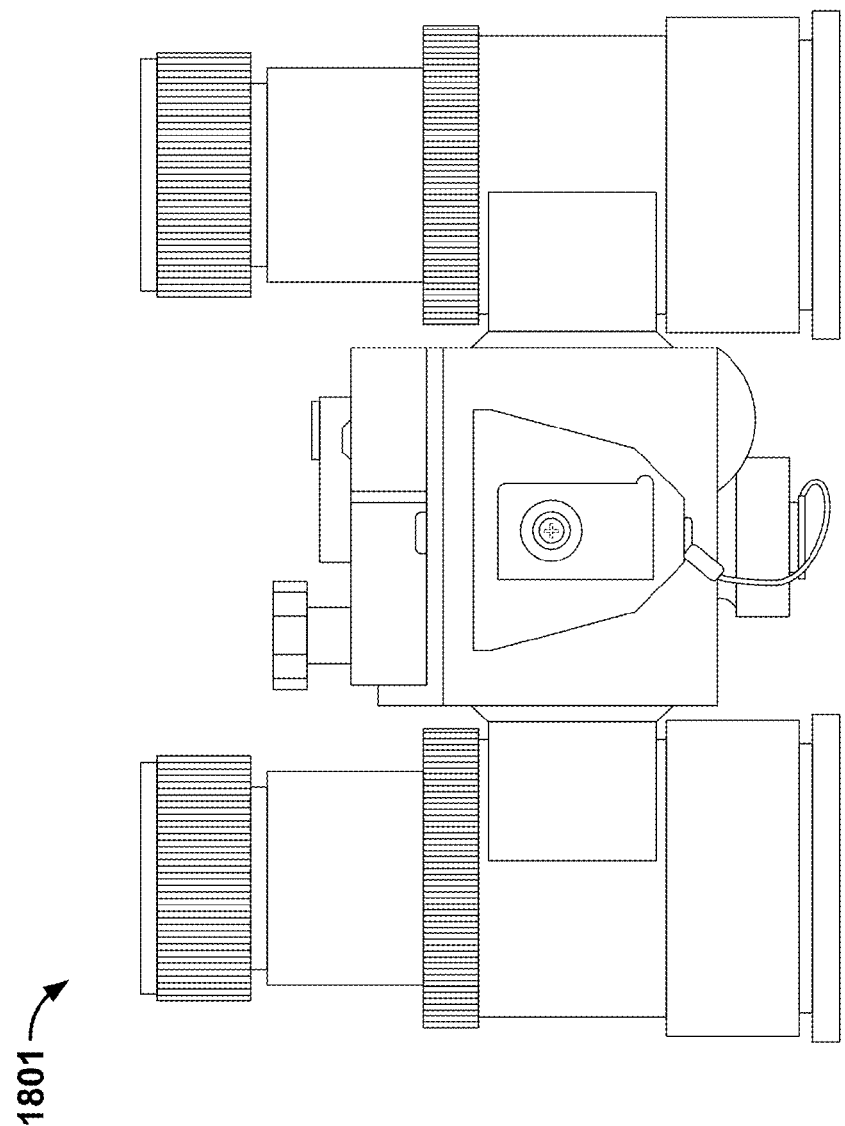
FIG. 18(A) illustrates the photograph of a completely retrofitted binocular NVG (1501) with both channels being integrated with the WFOV foveal objective and eyepiece.
Figure 18B:
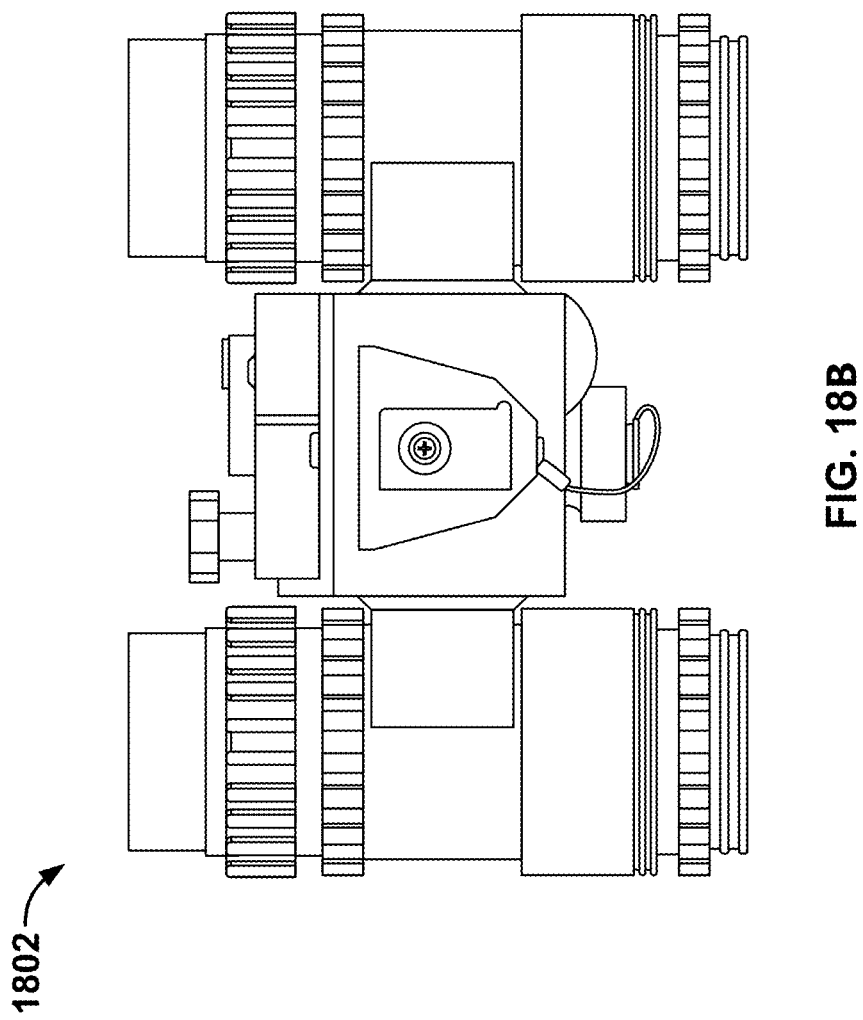
FIG. 18(B) illustrates a photograph of a standard PVS-15 NVG (1502).

FIG. 18a further shows the photograph of the completely retrofitted binocular NVG (1801) with both channels being integrated with the WFOV foveal objective and eyepiece, while FIG. 18b shows the standard PVS-15 NVG (1802).

Figure 19A:
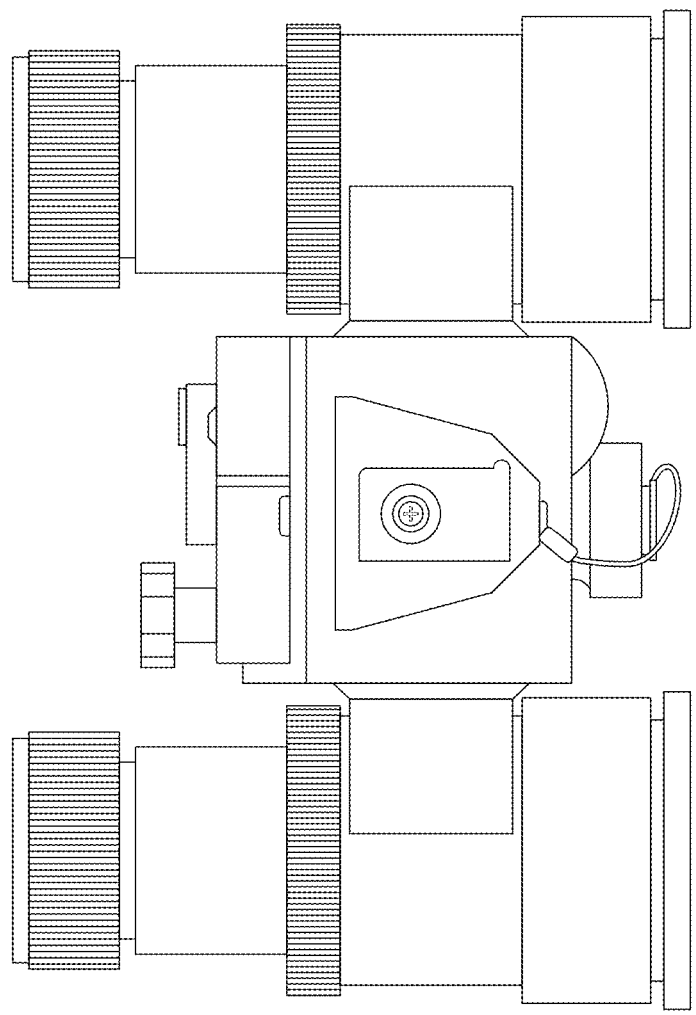
FIG. 19(A) illustrates a photograph of a retrofitted F-NVG binocular in top view and Figure (B) illustrates side view.
Figure 19B:
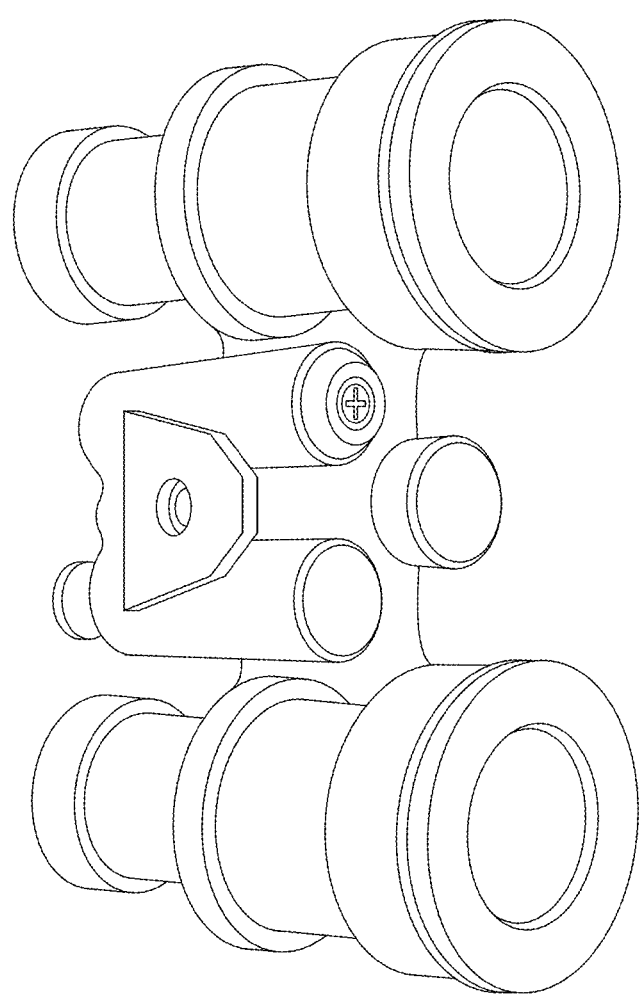

FIG. 19 shows the photograph of the binocular of the present invention retrofitted F-NVG in top (a) and side (b) views. The binocular of the present invention has an approximate total weight of 679 g (the standard PVS-15 has a total weight of 650 g).

Figure 20A:
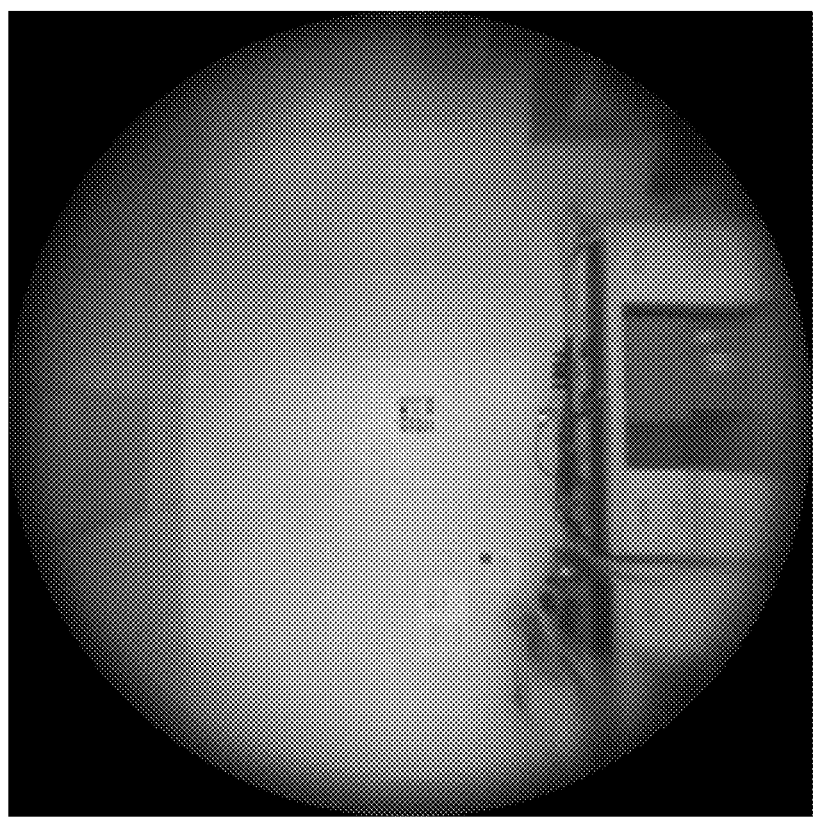
FIG. 20(A) illustrates the captured image of 80.1° FOV from a retrofitted F-NVG.
Figure 20B:
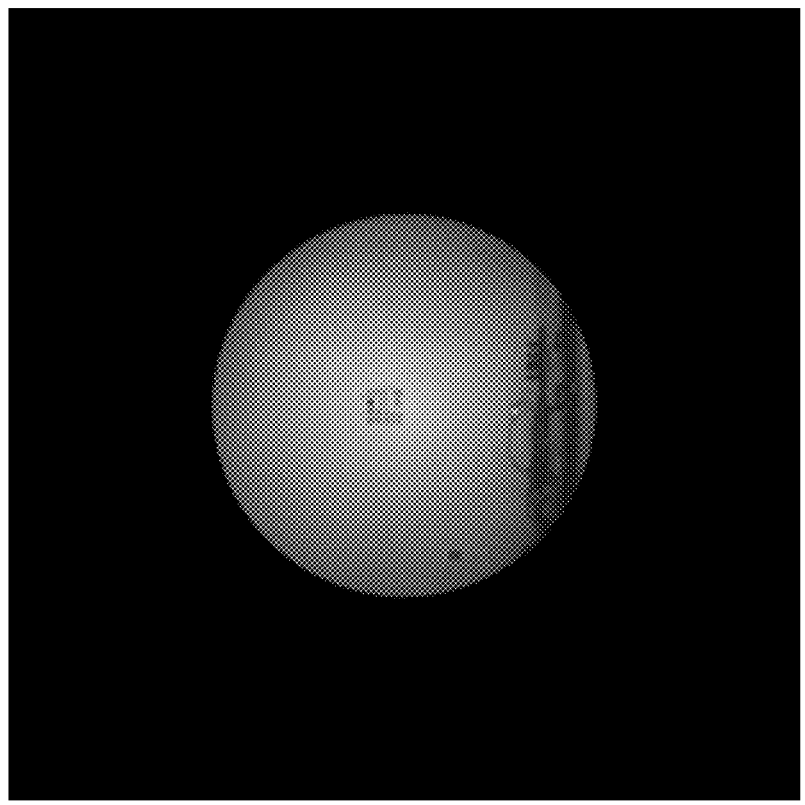
FIG. 20(B) illustrates the captured image of 40° FOV from a standard PVS-15.

The FOV value of the retrofitted wide field-of-view foveal night vision goggle (WFOV F-NVG) has been measured. The measured FOV of the retrofitted F-NVG is approximately circular 80.1°. FIG. 20a displays the captured image of the F-NVG field of view of 80° while FIG. 20b illustrates the image of the standard PVS-15 of circular FOV of 40°

The resolution of the retrofitted system was evaluated via the procedures disclosed previously. In the tests, two different image intensifiers were used in the retrofit F-NVG. One is the standard 64 lp/mm intensifier, currently deployed in PVS-15. Another one is the state-of-the-art tube with a resolution of 72-81 lp/mm.

Figure 21:
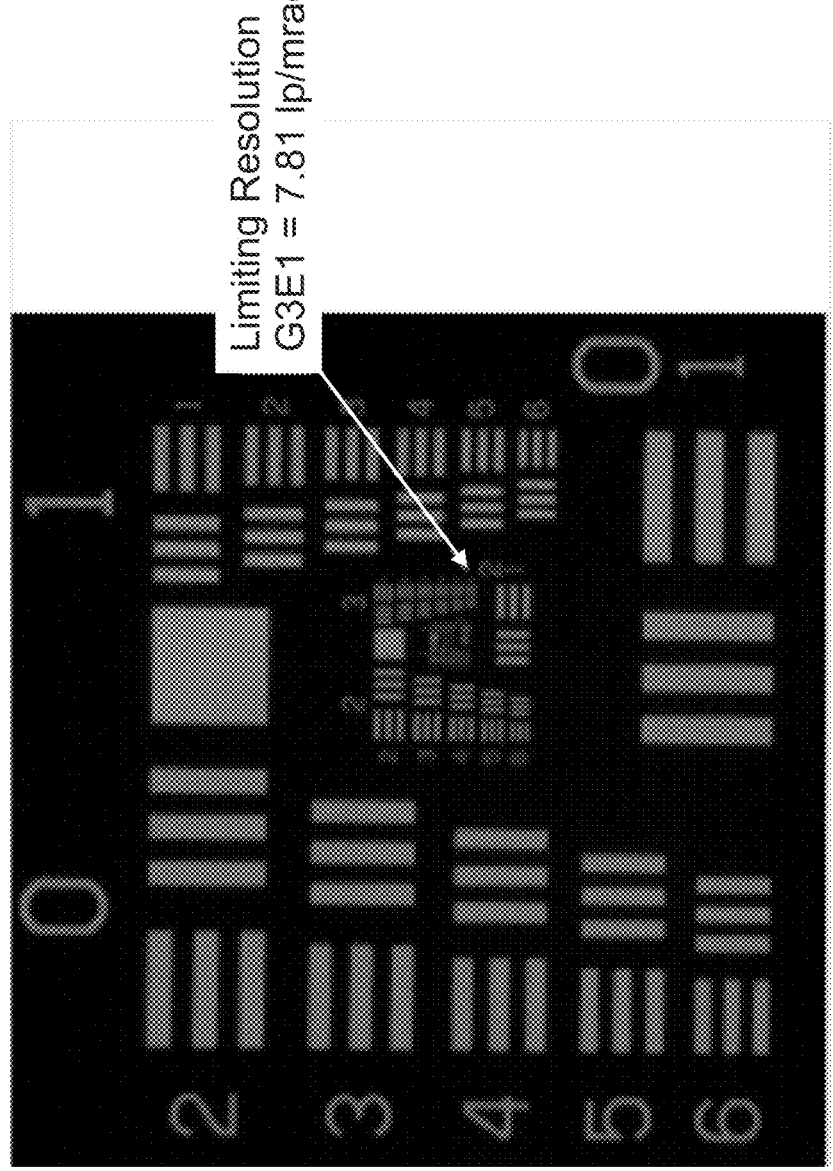
FIG. 21 illustrates a resolution check pattern for zoom camera test system.

FIG. 21 shows the captured picture of USAF 1951 placed approximately 21.5 inch in front of the camera. The testing camera has a resolution of well-above 7.81 cycles/mrad (G3E6) that is the finest test pattern on the chart, which is sufficient for testing the retrofitted F-NVG system resolution, as PVS-15 has a resolution around 1.3 cycles/mrad.

Figure 22A:
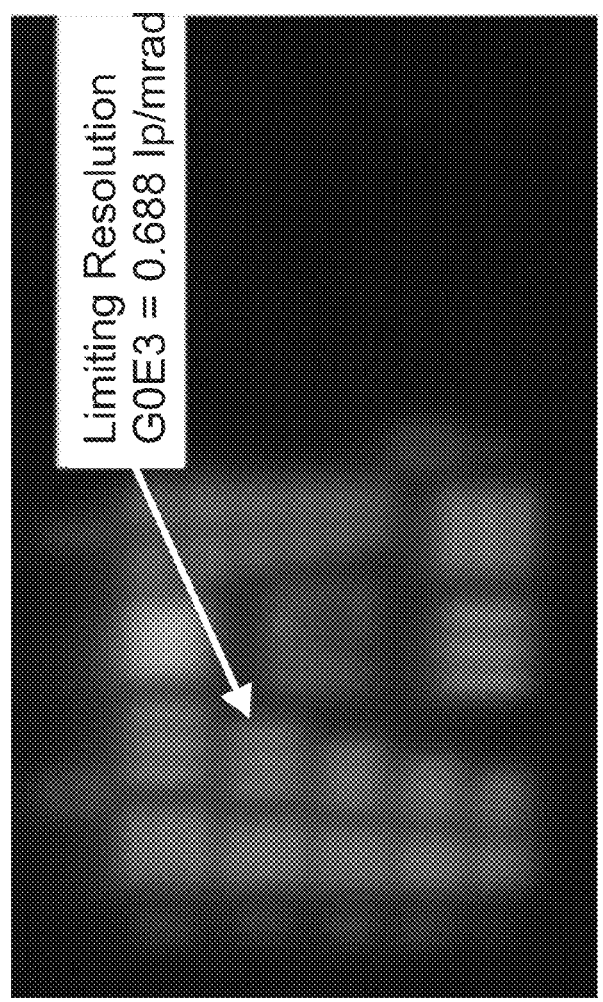
FIG. 22(A) illustrates limiting resolution of the retrofitted F-NVG with a standard 64-lp/mm image intensifier tube.

The measured on-axis resolution of the retrofitted F-NVG with 64 lp/mm image intensifier tube at 21.5 inch distance is G0E3, corresponding a resolution of 0.688 cycles/mrad, as shown in FIG. 22a.

Figure 22B:
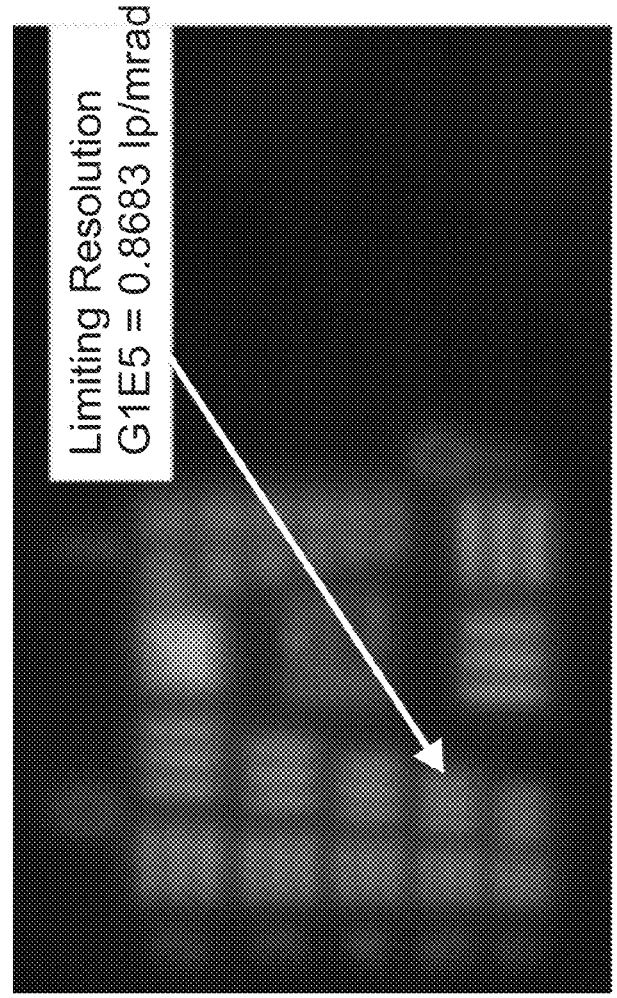
FIG. 22(B) illustrates limiting resolution of retrofitted F-NVG with a state-of-the-art image intensifier tube having 72-81 lp/mm resolution.

However, the retrofitted F-NVG with the state-of-the-art intensifier tube with a resolution of 72-81 lp/mm obtains the finer pattern of G1E5, reaching an on-axis resolution of 0.8683 cycles/mrad, as shown in FIG. 22b.

Modeling indicates that, however, when using a 64 lp/mm image intensified tube, the on-axis F-NVG should be 0.82 cycles/mrad. And when using the state-of-the-art intensifier tube, the on-axis resolution should be around 0.92 cycles/mrad. These calculated resolutions agree well with the test results. All the results indicate that the retrofitted NVG resolution is truly limited by the I2 tube resolution, as intended in the present invention.

Also, the off-axis resolution of the retrofitted F-NVG has been evaluated. The results show that the average off-axis resolution at half FOV (HFOV) of 14° is 0.42 cycles/mrad with the state-of-the-art image intensifier tube. This resolution is comparable to the expected system resolution of 0.39 cycles/mrad from design of foveal feature.

Figure 23:
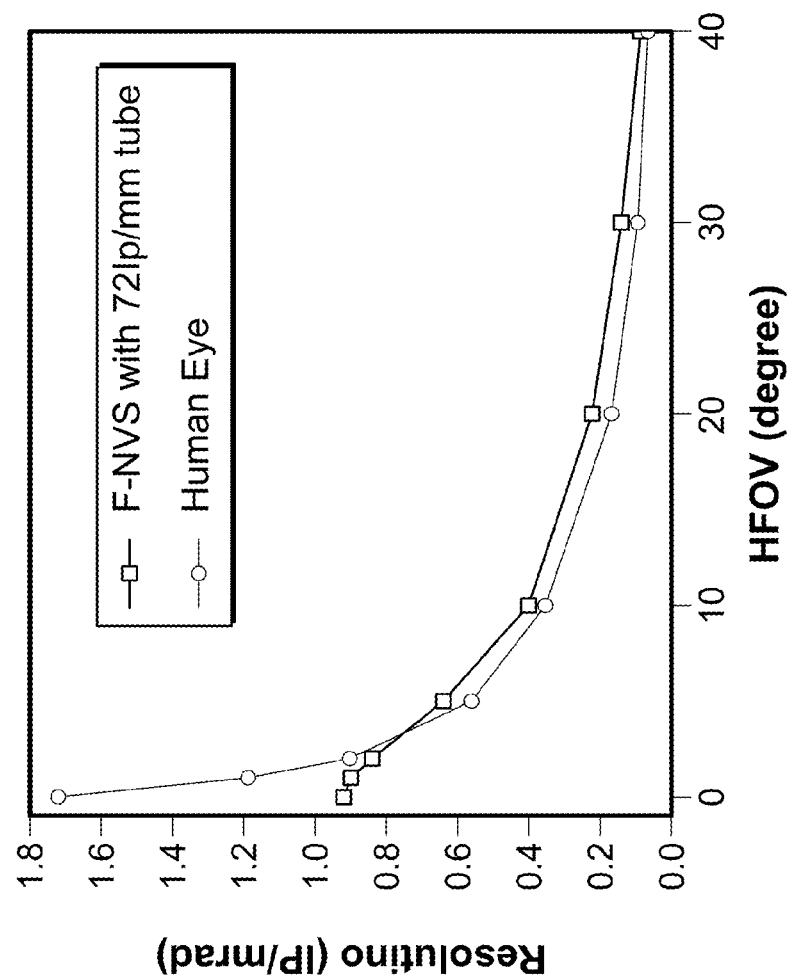
FIG. 23 illustrates the on-axis resolution of a retrofitted F-NVG vs HFOV versus the on-axis resolution of human eye.

The foveal characteristics of the WFOV F-NVG in the present invention are compared to the angular resolution of the human eye. FIG. 23 displays the resolution vs. the HFOV of the NVG, where the resolution of the F-OLA and F-ELA are from the measured values while the resolution of the I2 tube is obtained from published data. As can be seen, the resolution of the retrofitted WFOV foveal NVG follows a similar angular resolution profile as the human eye. Note: even though the absolute resolution is lower than that of the human eye, the profile is important here since this measured resolution is restricted by the I2 tube resolution not the F-OLA & F-ELA resolution.

Next, the eye relief (ER) of the WFOV foveal NVG (retrofitted) in the present invention has been evaluated. The eye relief (ER) of the WFOV foveal NVG (retrofitted) is approximately 15 mm for a full 80° FOV. However, if the viewer's eyes are moved away from the eyepiece exit pupil to a distance great than 15 mm to a maximum working distance around 25 mm, the effective FOV is slightly reduced. However, when translating from 15 mm to 25 mm the resolution and optical distortion in the center of the FOV remain largely unaffected.

Other tested and confirmed performance specifications include: 25 cm to infinity focus range, no greater than 2% an average optical distortion (an average optical distortion that is no greater than 1.5% within 5% of the optical axis), greater than 91.3% optical transmittance within a spectrum from 560 nm to 900 nm for the objective lens assembly, greater than 95% optical transmittance within a spectrum from 528.5 nm to 560 nm for the eyepiece assembly.

In the fourth embodiment of the present invention, a color/spectral filter is disclosed which is to be integrated into the system to further increase the final observable image quality of an NVG which uses I2 tubes.

Figure 24:
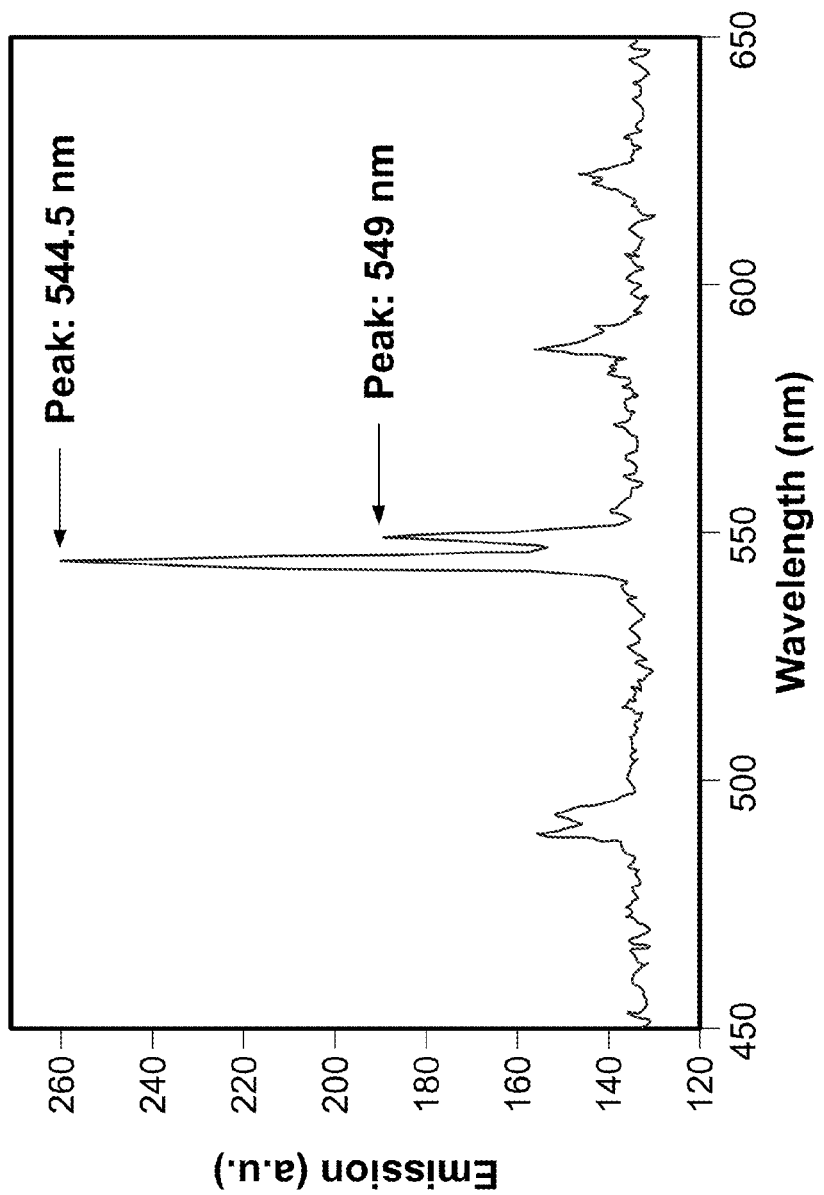
FIG. 24 illustrates the light emissions from an image intensifier tube, which is chromatic with 3 side lobes at approximately 480 nm, 583 nm, and 622 nm respectively.

Even though the Image Intensifier (I2) phosphor main emission is at approximately 544.5 nm, the image intensifier possess errant side lobes with additional lower intensity emissions at approximately 480 nm, 583 nm, and 622 nm, as plotted in FIG. 24. The multiple color emissions cause color aberration in the eyepiece which was designed for a clean monochromatic source wavelength of 544 nm. In order to correct this color aberration, a passive green bandpass filter such as Semrock FF01-536/40-20-D may be inserted right after the exit aperture of the I2 tube (i.e., near the fiber bundle).

An alternative is to deposit (form) a bandpass filter on any one of the optical elements in the optical train after the I2 tube, which includes the whole eyepiece lens assembly and demist filter. This bandpass filter must either pass multiple wavelengths not only at the 543.5 nm emission from the intensifier tube, but also the 588 nm from the yellow LED (light emission diode) and 654 nm of the red LED or have a sufficiently low neutral density value so as to block the side lobes while allowing the two wavelengths of the LED to pass. The yellow LED is an indicator for the NVG lower battery level and the red LED is an indicator for activating the infrared illuminator in the NVG system.

Figure 25A:
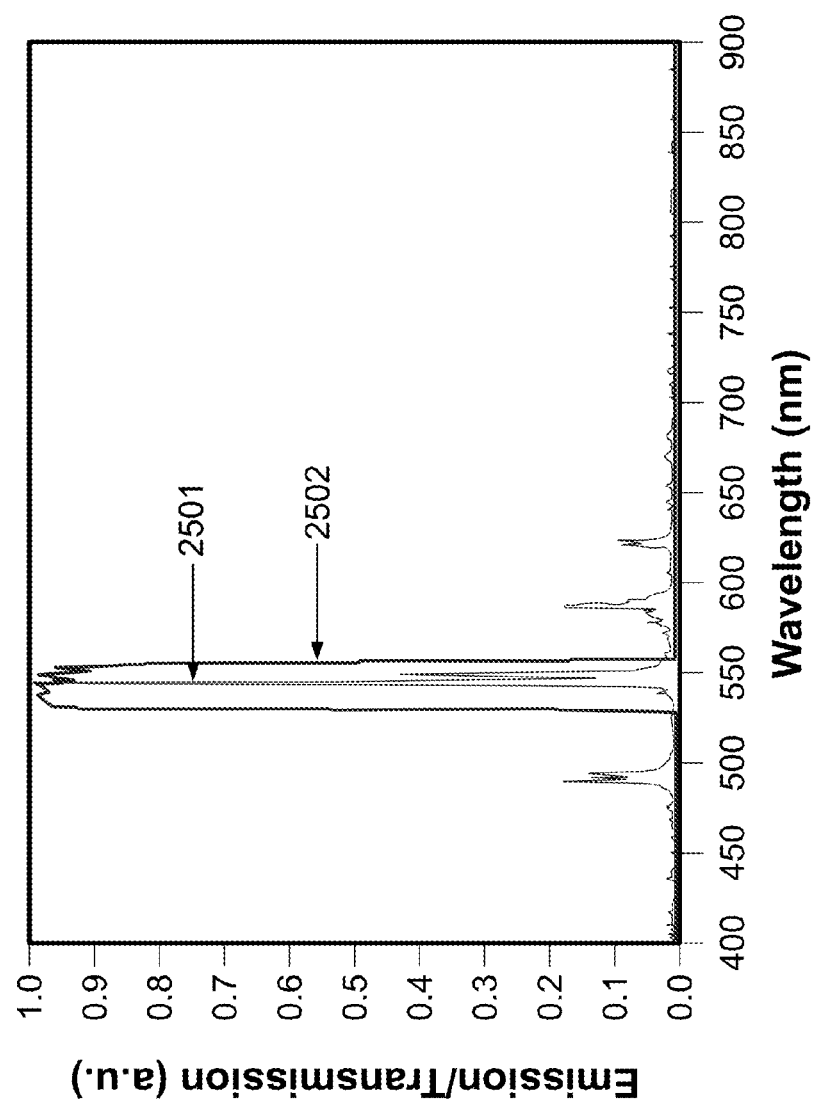
FIG. 25(A) illustrates the I2 emission and single bandpass filtering film spectrum.

As a third approach, a single bandpass filtering film is deposited (formed) on the any one of the optical elements in the optical train after the intensifier tube, as illustrated by the relative spectra in FIG. 25a, where the I2 emission spectrum (2501) and the single bandpass filtering film spectrum (2502) are presented. In order for the bandpass filter film to pass both emissions from the yellow and red LEDs, the filtering film is deposited as schematically shown in FIG. 25b. The most outer black ring (2503) is for the stray light stop or baffle, the circled area (2504) in the center is the coated single bandpass filter film (2504), and the clear gap ring (2505) between the black ring and the bandpass filter film is optically transparent to pass all the light emissions including the yellow and red LED emissions since only the LED light is in this area. An exemplary gap width of the clear gap ring is around 0.8 mm-2.0 mm and is determined by the LED size, I2 tube fiber exit aperture, and size of the nearest lens to the I2 tube exit aperture.

It is pointed out that the adaptation of the spectral filtering mechanism is not only applicable to the retrofitted NVG but also to any other NVG and or night vision devices.

Figure 26A:
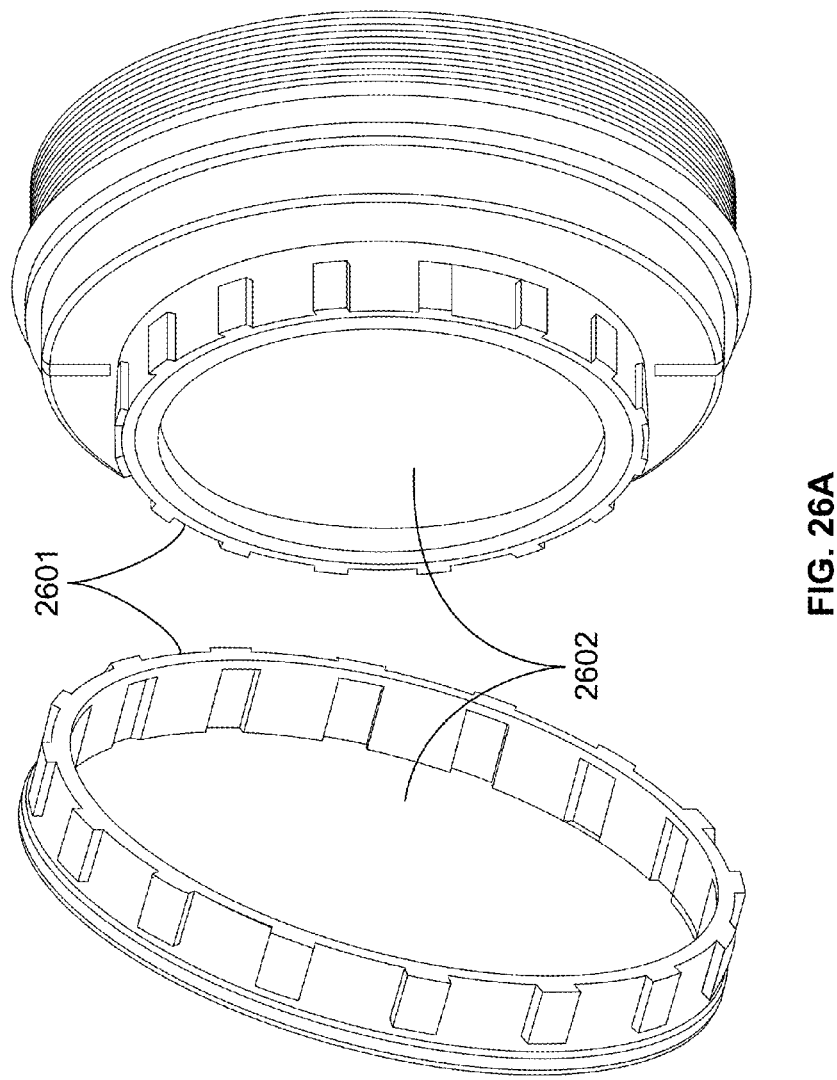

In the fifth embodiment of the present invention, modifications to the attachment mechanism of the demist shield/filter as well as the NVG eyecup are disclosed. As shown in FIG. 26a, the mounting fixture (2601) for the demist shield/filter (also termed as the shield) (2602) is changed from the currently adopted thread-in to a plug-in configuration to prevent the demist shield/filter (2602) and eyecup (2603) from falling off when the user rotates the eyecup for proper orientation, as schematically shown in FIG. 26b. The demist shield/filter (2602) is formed from rubber or other appropriate material with thin polycarbonate window (1 mm) glued on top. It comes with groves inside to mate to the eyepiece structure.

Figure 27:
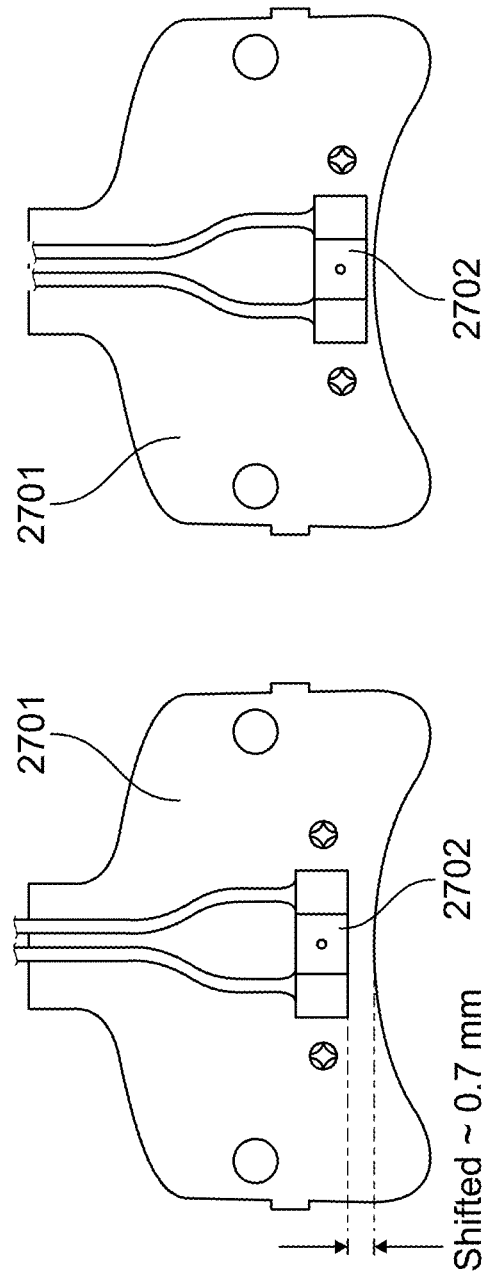
FIG. 27 displays the original and shifted LED locations.

In the sixth embodiment of the present invention, both the yellow and red LED locations are physically shifted outward by ~0.7 mm towards the edge of the electronic ribbon circuit (2701) as shown in FIG. 27. The LED (2702), which is located at the bounds of the I2 screen, is within ≈40.1° HFOV. FIG. 27 displays the original and shifted LED locations. The examination of this relocation, which makes it possible to view the LED through the F-ELA to see the LED emission when it is on; this result and implementation has been experimentally confirmed.

In the seventh embodiment of the present invention, a modification to the mounting fixture for attaching the retrofitted NVG on a helmet is disclosed.

Figure 28:
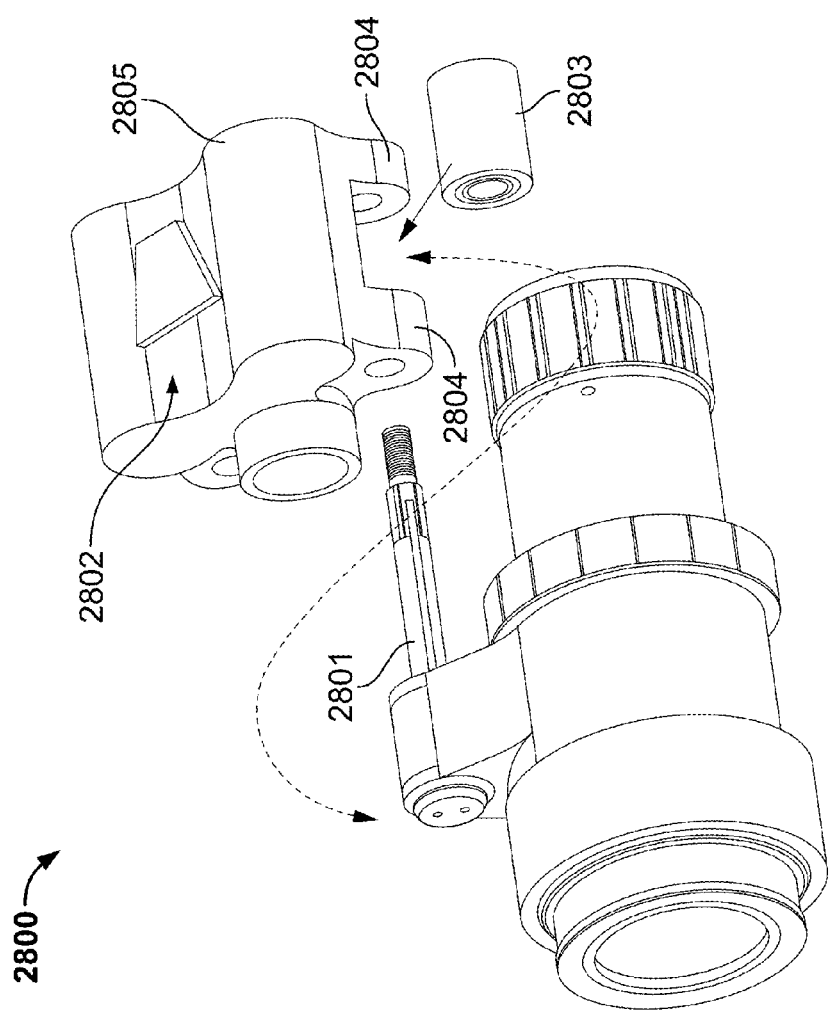
FIG. 28 illustrates a schematic diagram of the pivot adapter and channel.

FIG. 28 displays the schematic diagram of one channel of the mechanical retrofit (2800). As shown in FIG. 28, a longer pivot aluminum rod (Al-rod) (2801) is adopted, which shifts the NVG closer toward the viewer's eye in order to accommodate the eye relief of the retrofitted NVG and existing helmet and headgear attachments. In FIG. 28, the dovetail (2802) is the original one from the standard PVS-15 while the insert (2803) is inserted between the two mounting taps (2804) of the battery compartment (2805). The original attachment of the single channel was between the main-body under the dovetail (2802) mount that is the joint attachment point to the helmet. The modified mechanism moves the complete channel to the front of the main-body, towards the user.

It is pointed out that the disclosed design principle can be applied to other viewing systems. For example, the design principle can be applied to a digital vision device with the foveated characteristics. Such digital vision device uses an intensification focal plane array and/or image forming detector array to replace the image intensifier tube. In this system, the objective lens assembly images the scene onto the focal plane array and/or image forming detector array while the electronic output from the focal plane array and/or image forming detector array is electronically input into at least one display panel such as a micro-display. The display panel produces visual image. The eyepiece lens assemble then further relays the displayed image to the viewer's eye. The resulted device is expected to have a wide FOV and high optical on-axis resolution with the foveated characteristics.

The similar principle can also be applied to an imaging device which uses intensification focal plane array and/or image forming detector array in series with a wide FOV foveal objective lens assembly. In this system, the eyepiece lens assembly might not be necessary. The resulted system is a foveated imager or camera having wide FOV and high optical on-axis resolution with the foveated characteristics.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A night vision goggle configured for handheld use or mounting to a helmet comprising:
    at least one optical channel, comprising:
        an objective lens assembly configured to produce a first image of a scene; and
        an image forming device configured to receive the first image and convert the first image to a second image
        an one eye piece assembly connected to the objective lens assembly through the image forming device and configured to convey the second image for viewing by an eye,
    wherein the night vision goggle exhibits a circular field of view greater than 40° and an eye-relief of at least 15 mm; and
    wherein the night vision goggle is configured to minimize wavefront distortion in a foveal area such that the night vision goggle exhibits a foveated image of the scene for at least one field of view (FOV) wherein the optical on-axis resolution which decays toward the periphery of the field of view.

2. A night vision goggle in claim 1, wherein the image forming device comprises an image intensifier tube.

3. A night vision goggle in claim 2, wherein the on-axis optical resolution of the night vision goggle is limited by the spatial resolution of the image intensifier tube.

4. A night vision goggle in claim 1, wherein the image forming device comprises at least one intensification focal plane array and/or image forming detector array.

5. A night vision goggle in claim 1, wherein the night vision goggle has an average optical distortion that is no greater than 2%.

6. A night vision goggle in claim 1, wherein the night vision goggle has an average optical distortion that is no greater than 1.5% within 5% of an optical axis.

7. A night vision goggle in claim 1, wherein the night vision goggle has a focus range between 25 cm and infinity.

8. A night vision goggle in claim 1, wherein the optical transmittance of the objective lens assembly in the night vision goggle is greater than 91.3% within a spectrum from 560 nm to 900 nm.

9. A night vision goggle in claim 1, wherein the objective lens assembly in the night vision goggle includes a number of lenses that is equal to or less than 6 lenses.

10. A night vision goggle in claim 1, wherein the eyepiece lens assembly in the night vision goggle includes a number of lenses that is equal to or less than 3 lenses.

11. A night vision goggle in claim 1, wherein the eyepiece lens assembly has an optical transmittance greater than 95% within a spectrum from 528.5 nm to 560 nm.

12. A night vision goggle in claim 1, wherein the night vision goggle includes at least one lens having at least one surface whose curvature is aspherical.

13. A night vision goggle in claim 2 wherein the eyepiece lens assembly is coated with a bandpass filter that passes the light emission from the image intensifier tube.

14. A night vision goggle in claim 13 wherein the bandpass filter passes the light emission in a passband centered at 543.5 nm with a bandwidth of 30 nm and blocks the remaining light emission outside the passband.

15. A night vision goggle in claim 13, where in the bandpass filter is round and has a preferred diameter that is greater than 50% of a lens diameter of a lens in the eyepiece lens assembly and more than 1 mm smaller than a lens clear aperture (CA) diameter of the lens.

16. A night vision goggle in claim 13, wherein the bandpass filter is shaped to pass imagery and any indication signals from at least one LED.

17. A night vision goggle in claim 1, wherein the night vision goggle includes a demist filter.

18. A night vision goggle configured for handheld use or mounting to a helmet comprising:
    at least one optical channel, comprising:
        at least one objective lens assembly configured to produce a first image of a scene; and
        at least one intensification focal plane array configured to receive the first image and convert the first image to a second image, wherein the night vision goggle exhibits a circular field of view greater than 40°; and
    wherein the night vision goggle is s configured to minimize wavefront distortion in a foveal area such that the optical viewing apparatus exhibits a foveated image of the scene for at least one field of view (FOV) wherein the optical on-axis resolution is the highest along an optical axis and which decays toward the periphery of the field of view.

19. The night vision goggle of claim 1 wherein at least one of the objective lens assembly and the eye piece assembly is configured to minimize wavefront distortion in a foveal area.

20. The night vision goggle of claim 1, further comprising a first spatial light modulator configured to be positioned at one of a first location between the objective lens assembly and image intensifier tube or a second location between the eye piece assembly and eye.

21. The night vision goggle of claim 20, further comprising a second spatial light modulator configured to be positioned at another of the first and second locations.

22. The night vision goggle of claim 20 wherein the first spatial light modulator defines first and second areas, the first area causing a first optical phase shift in light passing through the first area and the second area causing a second optical phase shift, different than the first optical phase shift, in light passing through the second area.

23. The night vision goggle of claim 22 wherein the first and second areas form first and second rings.

24. The night vision goggle of claim 23 wherein the first and second rings have the same radial dimension.

25. The night vision goggle of claim 23 wherein the first and second rings having different radial dimensions.

26. The night vision goggle of claim 1 wherein the night vision goggle is monocular.

27. The night vision goggle of claim 1 wherein the night vision goggle is binocular.

28. An optical viewing apparatus, comprising:
    an objective lens assembly configured to produce a first image of a scene; and
    an image forming device configured to receive the first image and convert the first image to a second image
    an one piece eye assembly connected to the objective lens assembly through the image forming device and configured to convey the second image for viewing by an eye;
    wherein the optical viewing apparatus exhibits a circular field of view greater than 60° and an eye-relief of at least 15 mm; and,
    wherein the optical viewing apparatus is configured to minimize wavefront distortion in a foveal area such that the optical viewing apparatus exhibits a foveated image of the scene for at least one field of view (FOV) wherein the optical on-axis resolution decays toward the periphery of the field of view.

* * * * *